(12) United States Patent
Wazumi et al.

(10) Patent No.: US 10,527,747 B2
(45) Date of Patent: Jan. 7, 2020

(54) PROXIMITY SENSOR AND DETECTING METHOD

(71) Applicant: OMRON Corporation, Kyoto (JP)

(72) Inventors: Minami Wazumi, Nara (JP); Masayuki Koizumi, Nara (JP); Yusuke Nakayama, Fukuchiyama (JP)

(73) Assignee: OMRON Corporation, Kyoto (JP)

(*) Notice: Subject to any disclaimer, the term of this patent is extended or adjusted under 35 U.S.C. 154(b) by 167 days.

(21) Appl. No.: 15/842,891

(22) Filed: Dec. 15, 2017

(65) Prior Publication Data

US 2018/0267192 A1   Sep. 20, 2018

(30) Foreign Application Priority Data

Mar. 15, 2017   (JP) ................. 2017-049731

(51) Int. Cl.
*G01V 3/10* (2006.01)
*G01V 3/38* (2006.01)

(52) U.S. Cl.
CPC . *G01V 3/10* (2013.01); *G01V 3/38* (2013.01)

(58) Field of Classification Search
CPC .................................. G01V 3/10; G01V 3/38
USPC ...................................... 324/207.12; 250/221
See application file for complete search history.

(56) References Cited

U.S. PATENT DOCUMENTS 3,742,341 A * 6/1973 Clowes .................. G01V 3/101
324/329

8,217,335 B2 * 7/2012 Hiramatsu ............ G01S 7/4861
250/205
2015/0331135 A1* 11/2015 Widmer ................. G01V 3/101
324/234

FOREIGN PATENT DOCUMENTS

| | | |
|---|---|---|
| CN | 1516925 | 7/2004 |
| CN | 1774202 | 5/2006 |
| CN | 1950676 | 4/2007 |
| CN | 101535843 | 9/2009 |
| CN | 107132582 | 9/2017 |
| JP | H0886773 | 4/1996 |
| JP | 2009059528 | 3/2009 |

OTHER PUBLICATIONS

"Office Action of China Counterpart Application," dated Jul. 3, 2019, with English translation thereof, p. 1-p. 10.

* cited by examiner

*Primary Examiner* — Farhana A Hoque
(74) *Attorney, Agent, or Firm* — JCIPRNET

(57) ABSTRACT

A proximity sensor includes a transmission circuit that periodically supplies an excitation current in a pulse form to a detection coil for generating a magnetic field, a reception circuit that detects voltages or currents generated at both ends of the detection coil by the periodic supply of the excitation current, and a controller that detects presence or a position of the detection body by utilizing a time series signal obtained by the detection. The controller acquires a factor that influences the detection of the detection body in a first period of the time series signal. The controller compensates a signal in a second period of the time series signal by the factor. The controller detects the presence or the position of the detection body on the basis of a signal after the compensation.

15 Claims, 19 Drawing Sheets

PROXIMITY SENSOR AND DETECTING METHOD

CROSS-REFERENCE TO RELATED APPLICATION

This application claims the priority benefit of Japan application serial no. 2017-049731, filed on Mar. 15, 2017. The entirety of the above-mentioned patent application is hereby incorporated by reference herein and made a part of this specification.

BACKGROUND

Technical Field

The disclosure relates to a proximity sensor and a detecting method that is performed in a proximity sensor, and particularly to an inductive proximity sensor and a detecting method that is performed in an inductive proximity sensor.

Description of Related Art

A proximity sensor (inductive proximity sensor) that detects the presence or position of a detection body made of a metal by utilizing a magnetic field is known.

Patent Document 1 discloses a proximity sensor including a detection coil that generates a magnetic field, an excitation circuit that periodically supplies an excitation current in a pulse form to the detection coil, a detection circuit that detects the presence or position of a detection body made of a metal on the basis of voltages generated at both ends of the detection coil after the supply of the excitation current to the detection coil is blocked, and a control circuit. The control circuit controls the excitation circuit such that an excitation current supply period is equal to or greater than an excitation current supply block period.

In this manner, it is possible to suppress variation in a detection distance due to a thickness of the detection body in a case in which a material of the detection body is a non-magnetic metal, representative examples of which include aluminum. Also, it is possible to suppress variation in the detection distance of the proximity sensor if the thickness is the same both in a case in which the material of the detection body is iron and in a case in which the material of the detection body is aluminum (see "Abstract").

The proximity sensor described in Patent Document 1 can reduce the variation in the detection distance due to the thickness and the material of the detection body. According to such a proximity sensor, there are cases in which detection coil properties (an inductance component and a resistance component) change due to an external magnetic field, a temperature, and the like or the detection distance varies due to occurrence of electromagnetic noise and the like.

PATENT DOCUMENTS

[Patent Document 1] Japanese Patent Application Laid-Open (JP-A) No. 2009-59528
[Patent Document 2] Japanese Patent Application Laid-Open (JP-A) No. 8-86773

SUMMARY

According to an aspect of the invention, a proximity sensor detects the presence or position of a detection body by utilizing a magnetic field. The proximity sensor includes: a detection coil that generates a magnetic field; a transmission circuit that periodically supplies an excitation current in a pulse form to the detection coil; a reception circuit that detects voltages or currents generated at both ends of the detection coil by the periodic supply of the excitation current; and a controller that detects the presence or the position of the detection body by utilizing a time series signal obtained by the detection. The controller acquires a first factor that influences the detection of the detection body in a first period of the time series signal. The controller compensates a signal in a second period of the time series signal by the first factor. The controller detects the presence or the position of the detection body on the basis of a signal after the compensation.

According to another aspect of the invention, a detecting method is executed in a proximity sensor that detects the presence or position of a detection body by utilizing a magnetic field. The detecting method includes periodically supplying an excitation current in a pulse form to a detection coil for generating the magnetic field; detecting voltages or currents generated at both ends of the detection coil by the periodic supply of the excitation current; acquiring a first factor that influences the detection of the detection body in a first period of a time series signal obtained by the detection; compensating a signal in a second period of the time series signal by the first factor; and detecting the presence or the position of the detection body on the basis of a signal after the compensation.

BRIEF DESCRIPTION OF THE DRAWINGS

FIG. 18 is a diagram for explaining processing when a change in inductance of the detection coil is compensated for.

FIG. 19 is a diagram for explaining processing when a change in resistance of the detection coil is compensated for.

FIG. 20 is a diagram for explaining processing when a change in inductance of the detection coil and a change in resistance are compensated for.

DESCRIPTION OF THE EMBODIMENTS

Figure 1:
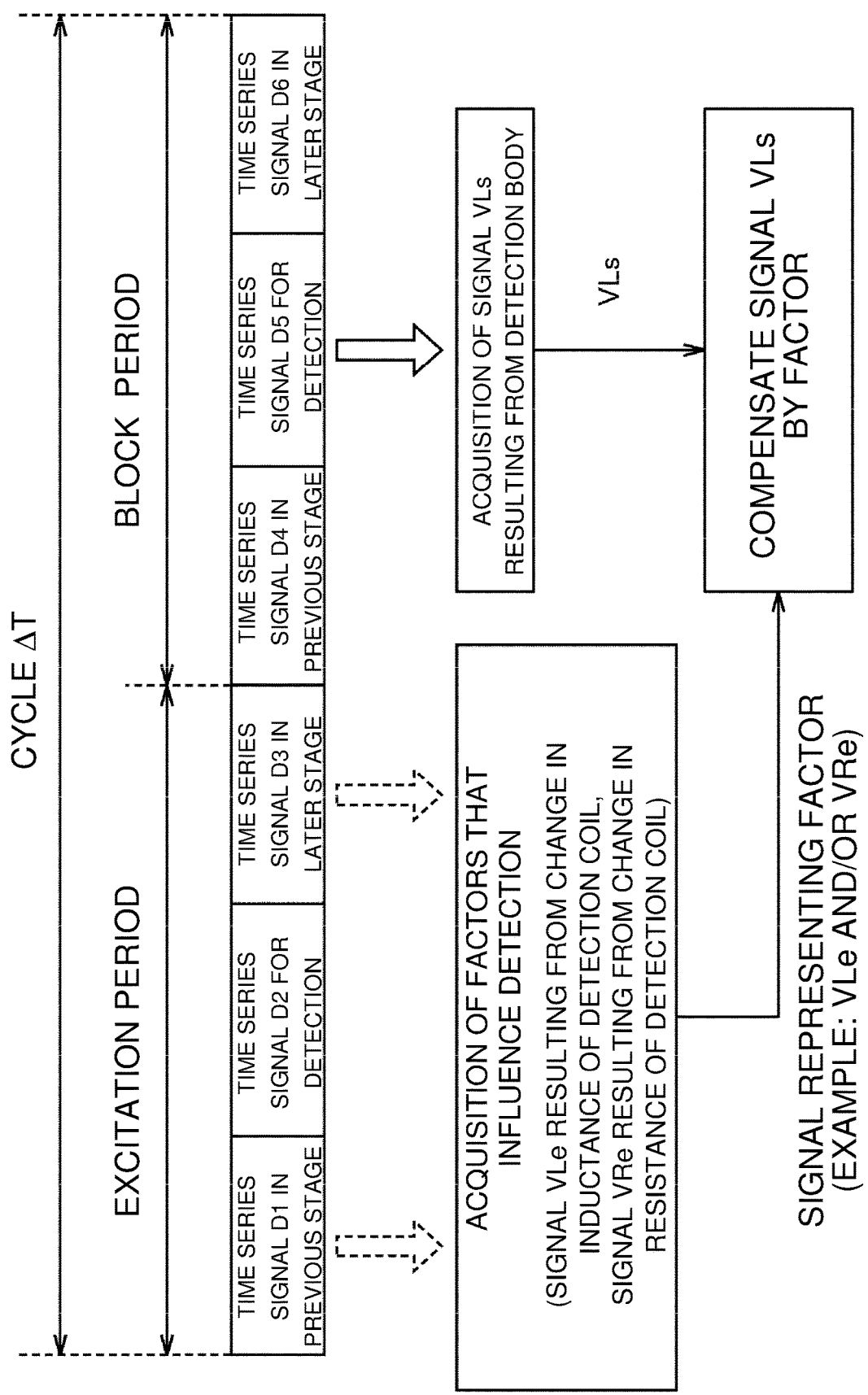
FIG. 1 is a diagram for explaining an outline of processing that is executed by a controller of such a proximity sensor.

One or some exemplary embodiments of the invention are made in view of the above circumstances, and an inductive proximity sensor and a method executed in an inductive proximity sensor capable of reducing the influence of a change in coil properties and/or the influence of disturbance noise are provided.

According to one or some exemplary embodiments of the invention, the controller acquires a second factor that influences the detection of the detection body in a third period of the time series signal. The controller compensates the signal in the second period of the time series signal by the first factor and the second factor.

According to one or some exemplary embodiments of the invention, the first period and the third period are included in a period during which the excitation current is supplied. The second period is included in a period during which the supply of the excitation current is blocked.

According to one or some exemplary embodiments of the invention, the first period, the second period, and the third period are included in a period during which the excitation current is supplied.

According to one or some exemplary embodiments of the invention, the first period, the second period, and the third period are included in a period in which the supply of the excitation current is blocked.

According to one or some exemplary embodiments of the invention, any one of the first factor and the second factor is a signal resulting from a change in inductance of the detection coil, and the other is a signal resulting from a change in resistance of the detection coil.

According to one or some exemplary embodiments of the invention, the signal in the second period is a signal resulting from the detection body. The controller performs the compensation by subtracting the signal resulting from the change in inductance of the detection coil and the signal resulting from the change in the resistance of the detection coil from the signal resulting from the detection body.

According to one or some exemplary embodiments of the invention, the first factor is a signal resulting from a change in inductance of the detection coil or a signal resulting from a change in resistance of the detection coil.

According to one or some exemplary embodiments of the invention, it is possible to reduce the influence of a change in coil properties and/or the influence of disturbance noise.

Hereinafter, embodiments of the invention will be described with reference to the drawings. In the following description, the same reference numerals will be given to the same components. The names and the functions thereof are also the same. Therefore, detailed description thereof will not be repeated.

A. OUTLINE OF PROCESSING

A proximity sensor according to the embodiment is an inductive proximity sensor that detects the presence or position of a detection body made of a metal by utilizing a magnetic field. Although details will be described later, the proximity sensor according to the embodiment compensates a signal for detection using a signal in a section that has not been used for detecting the detection body in the related art.

The proximity sensor includes at least a detection coil, a transmission circuit, a reception circuit, and a controller. The transmission circuit periodically supplies an excitation current in a pulse form to the detection coil. Specifically, the transmission circuit repeats supply and block of the excitation current. In this manner, the detection coil generates a magnetic field. The reception circuit detects voltages or currents generated at both ends of the coil by the periodic supply of the excitation current. The controller detects the presence or the position of the detection body by utilizing a time series signal obtained by the detection.

a1. First Processing Example

FIG. 1 is a diagram for explaining an outline of processing that is executed by the controller of such a proximity sensor. Referring to FIG. 1, the controller acquires a digitalized periodic time series signal by the detection processing of the reception circuit. A cycle $\Delta T$ includes an excitation period during which the excitation current is supplied and a block period during which the supply of the excitation current is blocked.

The excitation period includes a time series signal D2 that can be used for the detection of the detection body. The excitation period includes a time series signal D1 as a signal in a previous stage of the time series signal D2. Further, the excitation period includes a time series signal D3 as a signal in a later stage of the time series signal D2.

The block period also includes a time series signal D5 that can be used for the detection of the detection body. The block period includes a time series signal D4 as a signal in a previous stage of the time series signal D5. Further, the block period includes a time series signal D6 as a signal in a later stage of the time series signal D5.

The controller acquires a factor that influences the detection of the detection body from the time series signal D1 and/or the time series signal D3 in the excitation period. In a typical example, the controller acquires a signal VLe resulting from a change in inductance of the detection coil from the time series signal D1. The controller acquires a signal VRe resulting from a change in resistance of the detection coil from the time series signal D3.

The controller acquires a signal VLs resulting from the detection body from the time series signal D5 in the block period. The signal VLs resulting from the detection body may be the time series signal D5 itself or a part of the time series signal D5. Further, the signal VLs resulting from the detection body may be obtained by performing data processing, such as integration processing, on the time series signal D5.

The controller compensates the signal VLs resulting from the detection body using the acquired factor. Typically, the controller compensates the signal VLs resulting from the detection body by using at least one of the signal VLe resulting from the change in the inductance and the signal VRe resulting from the change in the resistance of the detection coil.

Specifically, the compensation of the signal VLs resulting from the detection body is performed by subtracting the signal VLe resulting from the change in the inductance and/or the signal VRe resulting from the change in the resistance of the detection coil from the signal VLs resulting from the detection body.

The controller detects the presence or the position of the detection body by using the signal VLs after the compensation. Therefore, the proximity sensor with such a configuration can reduce the influence of changes in coil properties (an inductance component, a resistance component).

a2. Second Processing Example

Figure 2:
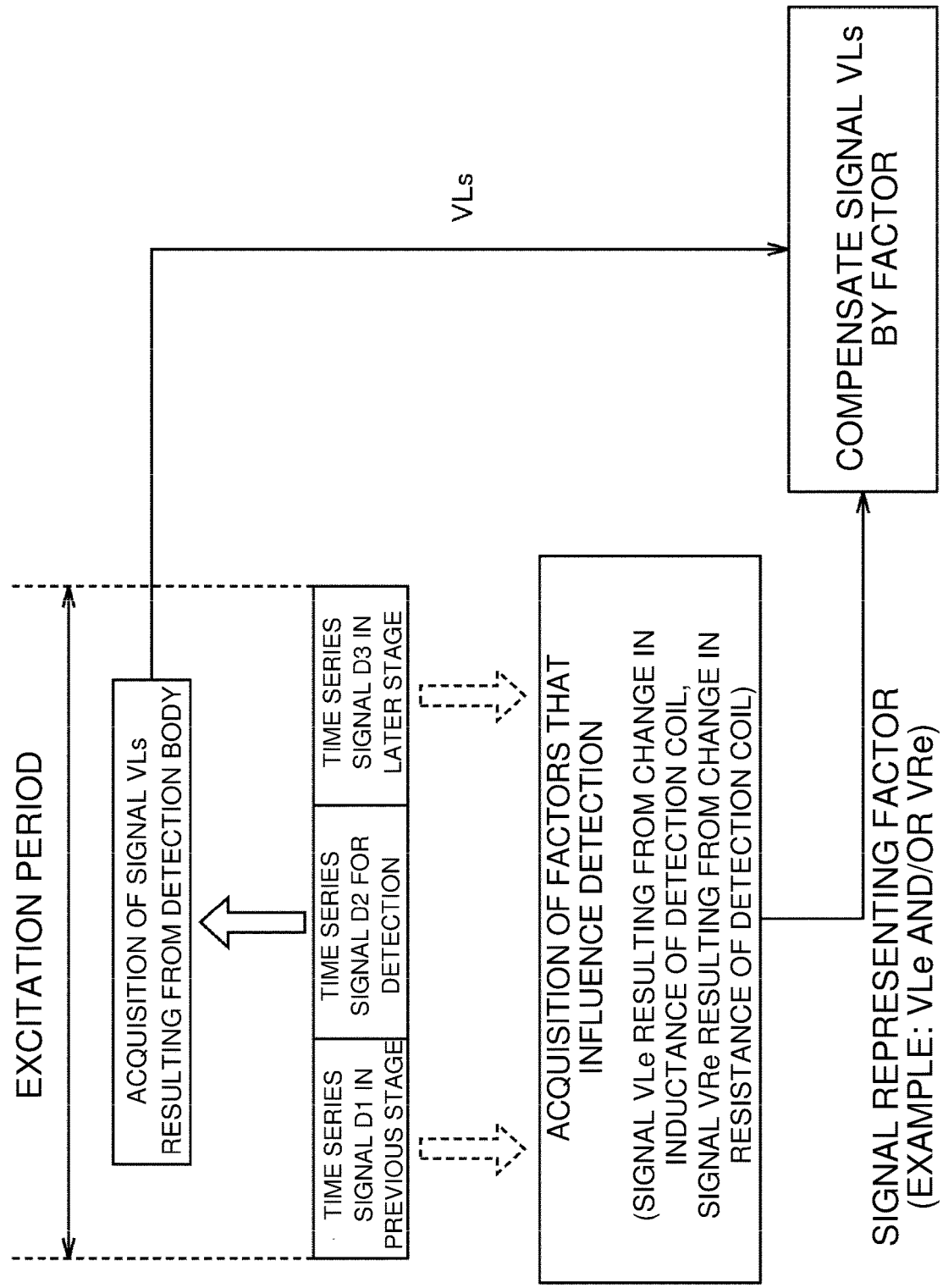
FIG. 2 is a diagram for explaining an outline of other processing that is executed by the controller of the proximity sensor.

FIG. 2 is a diagram for explaining an outline of other processing that is executed by the controller of the proximity sensor. Referring to FIG. 2, the controller 60 acquires a factor that influences the detection of the detection body from the time series signal D1 and/or the time series signal D3 in the excitation period. Typically, the controller 60 acquires the signal VLe resulting from a change in the inductance of the detection coil from the time series signal D1. The controller acquires the signal VRe resulting from a change in the resistance of the detection coil from the time series signal D3.

The controller 60 acquires the signal VLs resulting from the detection body from the time series signal D2 in the excitation period. In this manner, this configuration is different from the configuration in which the signal VLs is acquired from the time series signal D5 in the block period as illustrated in FIG. 1 in that the signal VLs is acquired from the time series signal D2 in the excitation period.

The controller 60 compensates the signal VLs acquired in the excitation period by using the factor acquired in the excitation period. Typically, the controller 60 compensates the signal VLs resulting from the detection body by using at least one of the signal VLe resulting from the change in the inductance and the signal VRe resulting from the change in the resistance of the detection coil in the same manner as in the case illustrated in FIG. 1.

The proximity sensor with such a configuration can also reduce the influence of changes in the coil properties (the inductance component and the resistance component).

Although the processing illustrated in FIG. 2 has a configuration that focuses on the excitation period, the signal VLs resulting from the detection body may be compensated using the time series signals D4 to D6 in the block period. That is, the controller 60 may compensate the signal VLs acquired in the block period using the aforementioned factor acquired in the block period and detect the presence or the position of the detection body using the signal VLs after the compensation.

Hereinafter, a structure of the proximity sensor will be described with reference to drawings, and details of processing that is executed by the proximity sensor will be described appropriately referring to the drawings.

Hereinafter, the signal VLs resulting from the detection body will also be referred to as a "detection body detection signal VLs," the signal VLe resulting from a change in the inductance will be referred to as a "coil inductance detection signal VLe," and the signal VRe resulting from a change in the resistance of the detection coil 11 will be referred to as a "coil resistance detection signal VRe" for convenience of description.

B. SENSOR STRUCTURE

Figure 3:
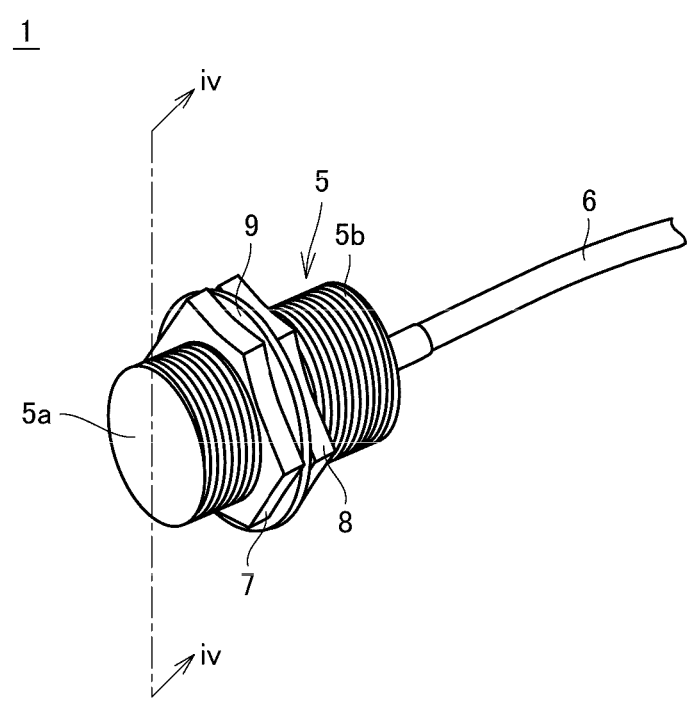
FIG. 3 is a perspective view of the proximity sensor according to the embodiment.

FIG. 3 is a perspective view of the proximity sensor 1 according to the embodiment. Referring to FIG. 3, the proximity sensor 1 includes a main body 5, a lead line 6 that is connected to the main body 5, nuts 7 and 8, and a washer 9 that is arranged between the nuts 7 and 8.

The main body 5 has a circular detection surface 5a and a tubular case body 5b. Thread grooves for the nuts 7 and 8 are formed in the surface of the case body 5b. The detection surface 5a is part of a cap that is fit to the case body 5b.

The nuts 7 and 8 and the washer 9 are used for attaching the proximity sensor 1 to a support member of a device or the like. For example, the main body 5 can be fixed to the support member by pinching a part of an attachment tool (an L-shaped tool, for example) between the nuts 7 and 8.

Figure 4:
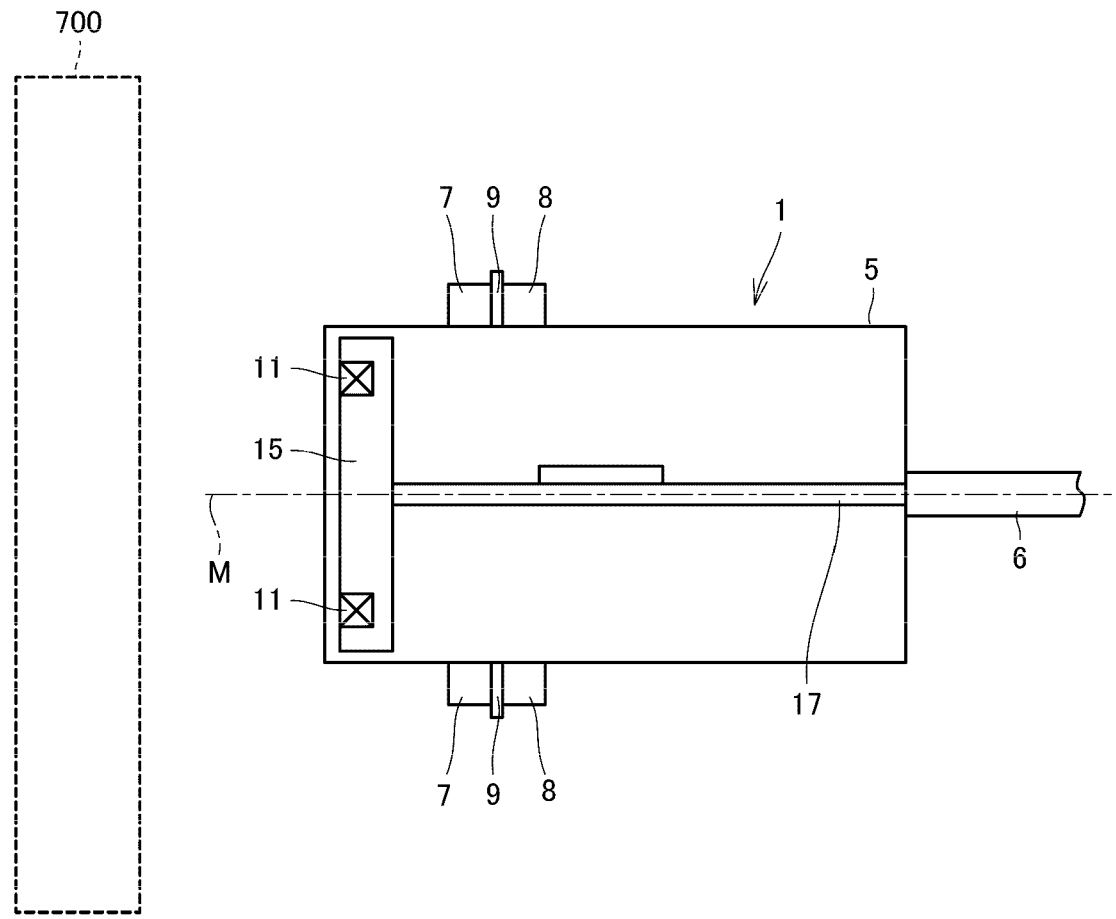
FIG. 4 is a sectional view taken along the arrow of the line iv-iv in FIG. 3.

FIG. 4 is a sectional view taken along the arrow of the line iv-iv in FIG. 3. Referring to FIG. 4, the main body 5 has a detection coil 11, a ferrite core 15, an electronic circuit 17 (hybrid IC) with elements arranged on a substrate, and an operation display light which is not illustrated in the drawing. The main body 5 is filled with resin.

The detection coil 11 is an annular coil. The center of the detection coil 11 is positioned on a central axis M of the main body 5. The detection coil 11 is electrically connected to the electronic circuit 17. The electronic circuit 17 is supplied with electricity via the lead line 6 and is electrically connected to an external electronic device.

If a high-frequency magnetic field is generated by causing an excitation current to flow through the detection coil 11, an eddy current (inductive current) flows through a detection body 700. Inductive voltages (transient signals) are generated at both ends of the detection coil 11 by the eddy current. The proximity sensor 1 detects these inductive voltages. In this manner, the proximity sensor 1 detects the presence of the detection body 700. The proximity sensor 1 is not limited thereto and may have another configuration for detecting the position of the detection body 700.

Figure 5:
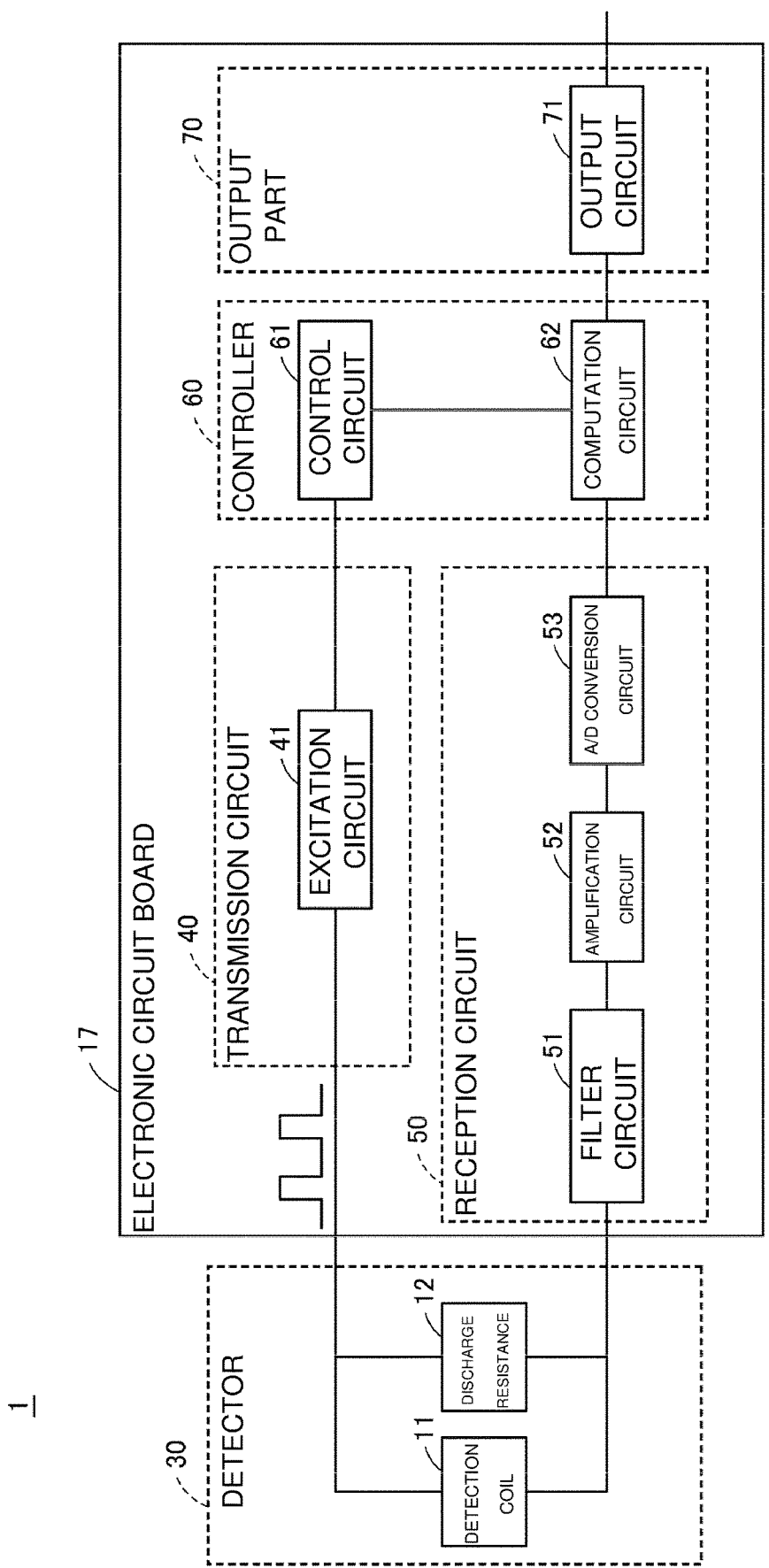
FIG. 5 is a block diagram for explaining a schematic configuration of the proximity sensor.

FIG. 5 is a block diagram for explaining a schematic configuration of the proximity sensor 1. Referring to FIG. 5, the proximity sensor 1 includes a detector 30, a transmission circuit 40, a reception circuit 50, a controller 60, and an output part 70. The transmission circuit 40, the reception circuit 50, the controller 60, and the output part 70 are realized as the electronic circuit 17.

The detector 30 includes a coil 11 and a discharge resistance 12. The controller 60 has a control circuit 61 and a computation circuit 62. The output part 70 includes an output circuit 71. The transmission circuit 40 includes an excitation circuit 41. The reception circuit 50 includes a filter circuit 51, an amplification circuit 52, and an analog/digital (A/D) conversion circuit 53.

The controller 60 controls overall operations of the proximity sensor 1. The control circuit 61 of the controller 60 transmits an excitation control signal for controlling a timing of excitation to the transmission circuit 40.

The excitation circuit 41 that serves as the transmission circuit 40 generates an excitation current in a pulse form on the basis of the excitation control signal and outputs the excitation current to the detector 30.

The reception circuit 50 detects a voltage or a current generated by the detector 30 by the supply and the block of the excitation current. Specifically, the reception circuit 50 detects voltages (voltage signals) generated at both ends of the detection coil 11. The reception circuit 50 outputs the detection result to the controller 60. The reception circuit 50 will be described in detail below.

An analog signal that represents the detection result of the detection coil 11 is input to the filter circuit 51. The filter circuit 51 performs predetermined filtering processing on the input analog signal in order to remove noise.

The amplification circuit 52 amplifies the analog signal, on which the filtering processing has been performed, and outputs an analog signal after the amplification to the A/D conversion circuit 53.

The A/D conversion circuit 53 converts the analog signal that has been amplified by the amplification circuit 52 into a digital signal. The A/D conversion circuit 53 outputs the digital signal to the computation circuit 62.

The computation circuit 62 of the controller 60 performs computation, which will be described later, on a signal output from the reception circuit 50 and outputs a computation result (signal) to the output part 70.

The output part 70 transmits the signal (detection result) sent from the controller 60 to an electronic device as a connection source of the proximity sensor 1 via the lead line 6.

As described above, the proximity sensor 1 detects the presence or the position of the detection body 700 by utilizing a magnetic field. The proximity sensor 1 has a configuration including (i) the detection coil 11 that generates a magnetic field, (ii) the transmission circuit 40 that periodically supplies an excitation current in a pulse form to the detection coil 11, (iii) the reception circuit 50 that detects voltages or currents generated at both ends of the detection coil 11 by the periodic supply of the excitation current, and (iv) the controller 60 that detects the presence or the position of the detection body 700 by utilizing a time series signal obtained by the detection.

The proximity sensor 1 may include a plurality of coils in the detector 30. For example, a case in which the detection coil 11 includes a transmission coil and a reception coil is exemplified. Although the controller normally executes filtering processing based on a filtering coefficient acquired in the excitation period, the reception circuit 50 may perform the filtering processing executed by the controller 60 by passing the filtering coefficient from the computation circuit 62 to the reception circuit 50 and changing the filtering coefficient of the reception circuit 50.

C. DATA PROCESSING

Hereinafter, a case in which the first processing is mainly performed from among the aforementioned first processing example (FIG. 1) and the second processing example (FIG. 2) will be exemplified and described.

(C1. Time Chart)

Figure 6:
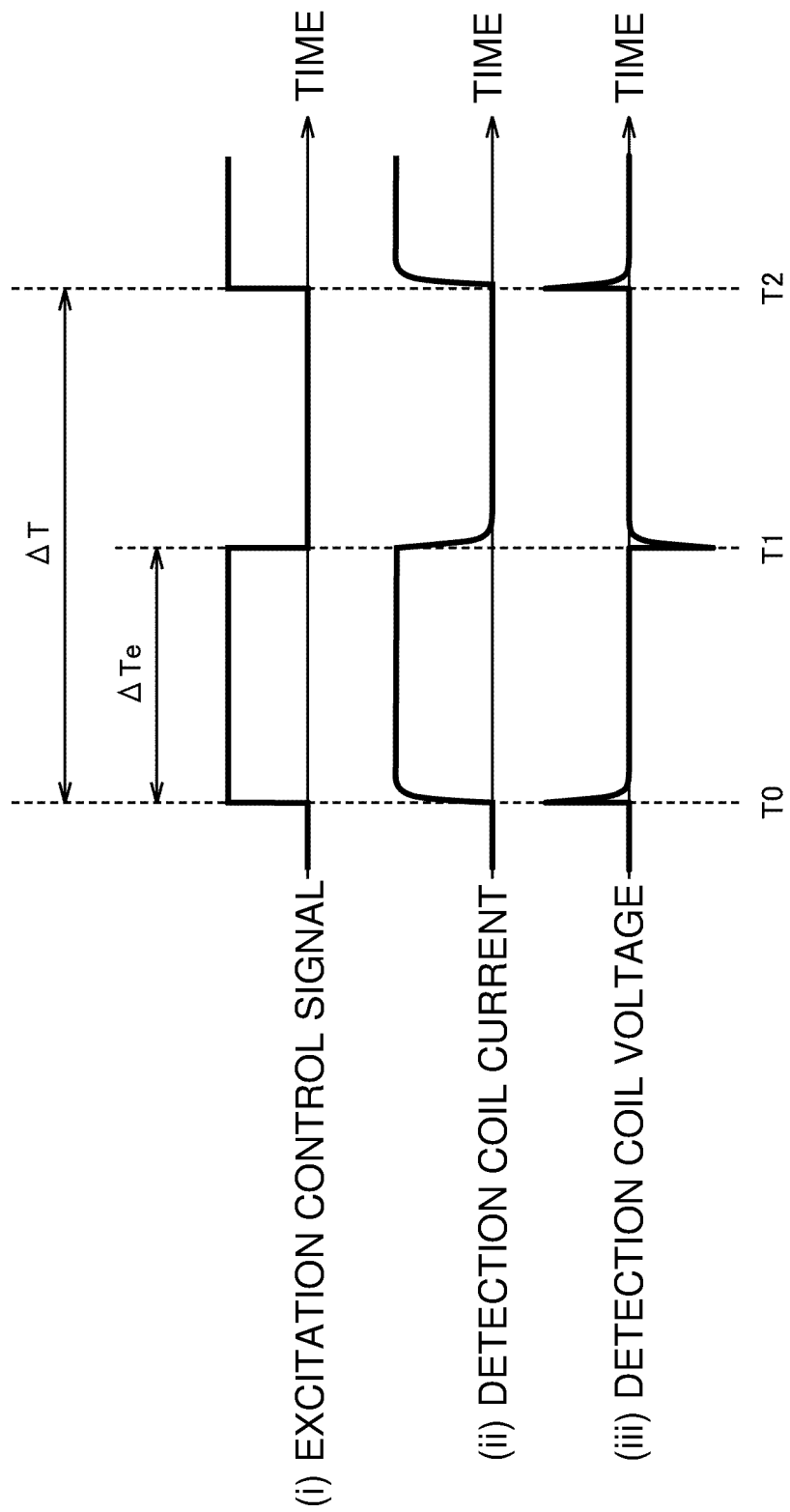
FIG. 6 is a time chart of a signal that is generated or received by the proximity sensor.

FIG. 6 is a time chart of a signal that is generated or received by the proximity sensor 1. Referring to FIG. 6, if an excitation control signal to be sent from the control circuit 61 to the excitation circuit 41 rises at a time T0 as illustrated in a graph (i), the excitation circuit 41 supplies a current. Then, a current rises with a predetermined time constant in the detection coil 11 as illustrated in a graph (ii), and an inductive voltage generated at the time of the start of the excitation settles down with a predetermined time constant as illustrated in a graph (iii).

If the excitation current is blocked at a time T1 that comes ΔTe hours later than the time T0 as illustrated in the graph (i), the current falls with a predetermined time constant as illustrated in the graph (ii), and the inductive voltage that is generated in the direction opposite to that when the excitation is started settles down with a predetermined time constant as illustrated in the graph (iii).

The phenomenon from the time T0 to a time T2 is repeated even at and after the time T2 that comes a cycle ΔT later than the time T0.

(C2. Method of Deciding Coil Signal Acquisition Time)

Figure 7:
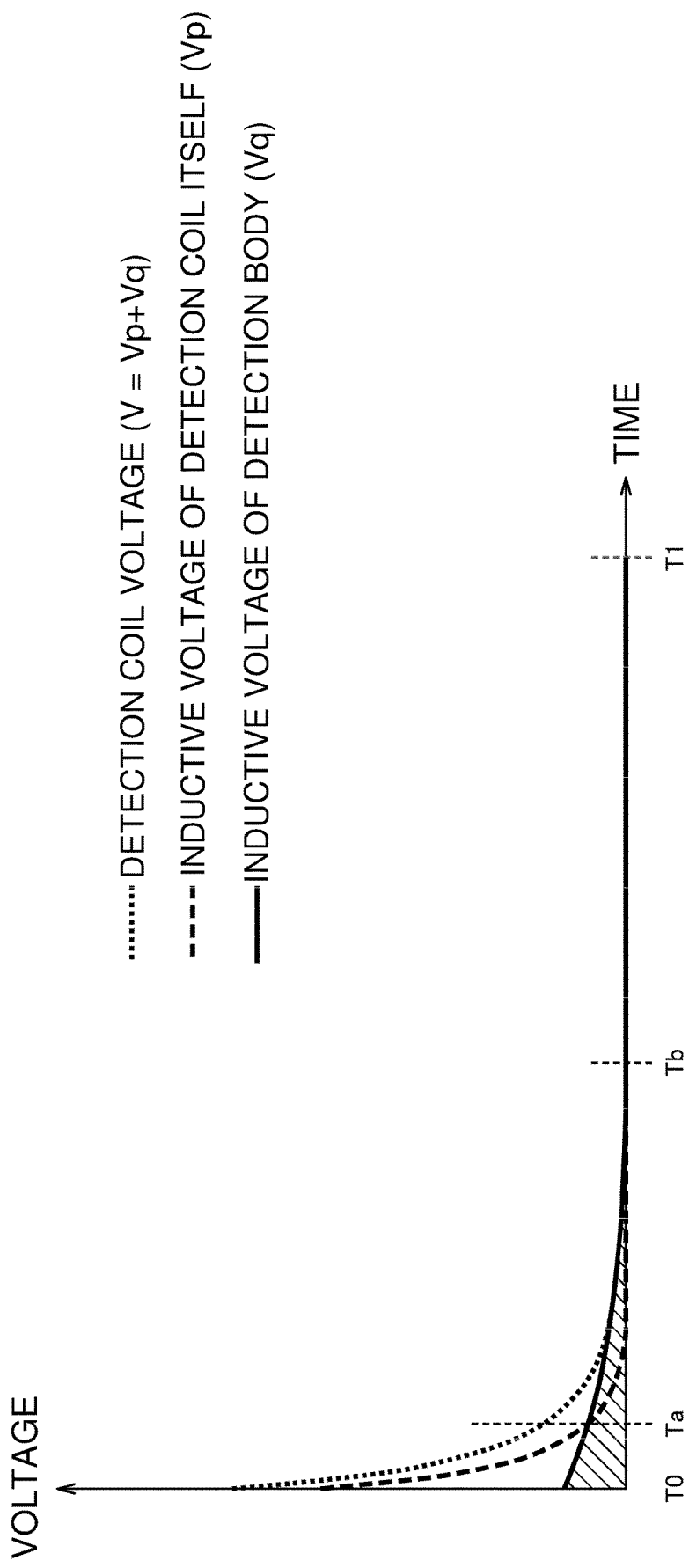
FIG. 7 is an enlarged view of main parts of a voltage signal representing a detection coil voltage illustrated in FIG. 6 from a time T0 to a time T1.
Figure 8:
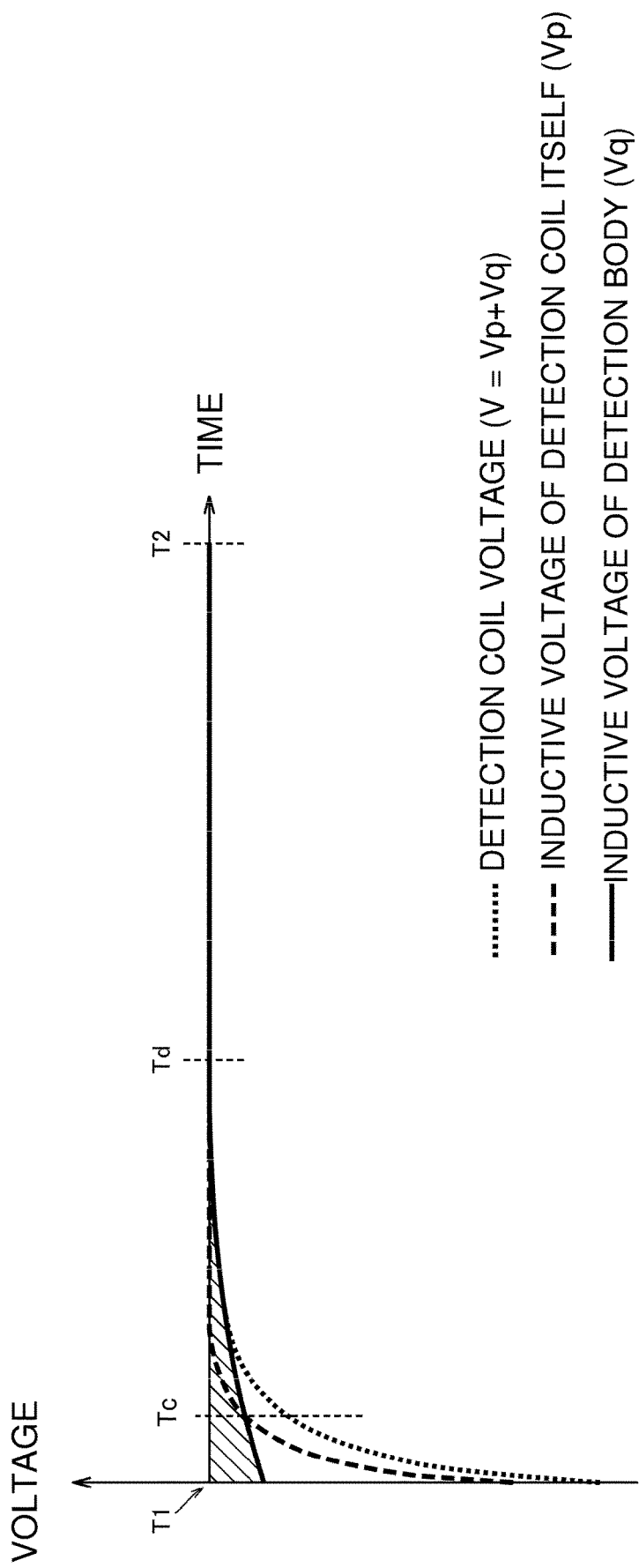
FIG. 8 is an enlarged view of main parts of the voltage signal representing the detection coil voltage illustrated in FIG. 6 from the time T1 to a time T2.
Figure 9:
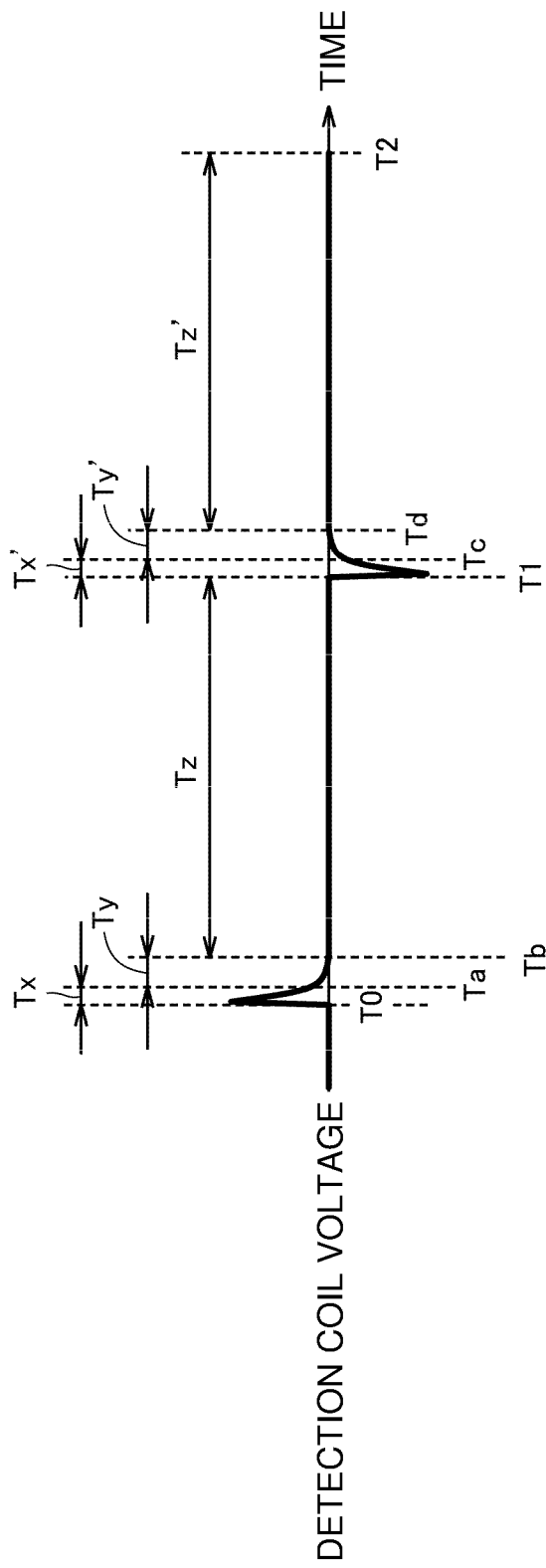
FIG. 9 is a diagram for explaining the meanings of a plurality of periods included in one cycle of the voltage signal representing the detection coil voltage.

FIG. 7 is an enlarged view of main parts of the voltage signal (graph (iii)) representing the detection coil voltage illustrated in FIG. 6 from the time T0 to the time T1. FIG. 8 is an enlarged view of main parts of the voltage signal representing the detection coil voltage illustrated in FIG. 6 from the time T1 to the time T2. FIG. 9 is a diagram for explaining the meanings of a plurality of periods included in one cycle of the voltage signal representing the detection coil voltage.

The inductive voltage generated in the detection coil 11 immediately after the start of the supply of the excitation current or immediately after the block of the excitation steeply decreases due to the discharge resistance 12 that is connected to the detection coil 11 in parallel. In a case in which the detection body 700 has approached the proximity sensor 1, the inductive voltage is further generated in the detection coil 11 due to the influence of an eddy current generated in the detection body 700 when the excitation of the excitation current is started or the excitation current is blocked.

A resistance value of the discharge resistance 12 is set such that the time constant of the inductive voltage generated by the detection body 700 becomes greater than the time constant of the circuit that includes the detection coil 11 and the discharge resistance 12. Therefore, the inductive voltage of the detection coil 11 itself is dominant as the detection coil voltage until a specific time after the start of the excitation of the excitation current or after the block of the excitation current, and the inductive voltage due to the eddy current is dominant at and after the time.

Referring to FIGS. 7 and 8, the graph represented by the dotted line represents the detection coil voltage. The graph represented by the broken line represents the inductive voltage of the detection coil itself. The graph represented by the solid line represents the inductive voltage of the detection body. The detection coil voltage is represented as a sum of the inductive voltage of the detection coil itself and the inductive voltage of the detection body. The hatched regions in the drawings are integration data of the inductive voltage of the detection body 700.

Referring to FIG. 9, the inductive voltage of the detection coil 11 is dominant as the detection coil voltage in the period Tx (from the time T0 to a time Ta) from the start of the excitation of the excitation current to a specific time. In the following period Ty (from the time Ta to a time Tb), the inductive voltage due to the eddy current is dominant. The inductive voltage of the detection coil 11 itself is dominant as the detection coil voltage in a period Tx' (from the time T1 to a time Tc) from the block of the excitation current to a specific time. In the following period Ty' (from the time Tc to a time Td), the inductive voltage due to the eddy current is dominant.

If the inductance of the detection coil changes due to a direct magnetic field and the like, the time constant of the detector changes. Therefore, the computation circuit 62 can acquire the change in the inductance by using a change in the voltage in the periods Tx and Tx' (from the time T0 to the time Ta and from the time T1 to the time Tc) during which the inductive voltage of the detection coil itself is dominant.

In a period Tz (from the time Tb to the time T1) during which the inductive voltage of the detection coil 11 and the detection body 700 settle down during the excitation, the voltage generated in the detection coil 11 has a magnitude that depends on a direct current resistance value of the detection coil 11 and the excitation current. Therefore, the computation circuit 62 can acquire a change in the resistance value of the detection coil 11 due to a variation in temperature or the like by using the voltage in the period Tz (rom the time Tb to the time T1).

Therefore, the signal representing a change in the inductance may be acquired by using a part of the detection coil voltage in the period Tz (or the period Tx'). Meanwhile, the signal representing a change in the resistance may be acquired by using a part of the detection coil voltage in the period Tz.

(C3. Method of Acquiring Change in Coil Properties)

Figure 10:
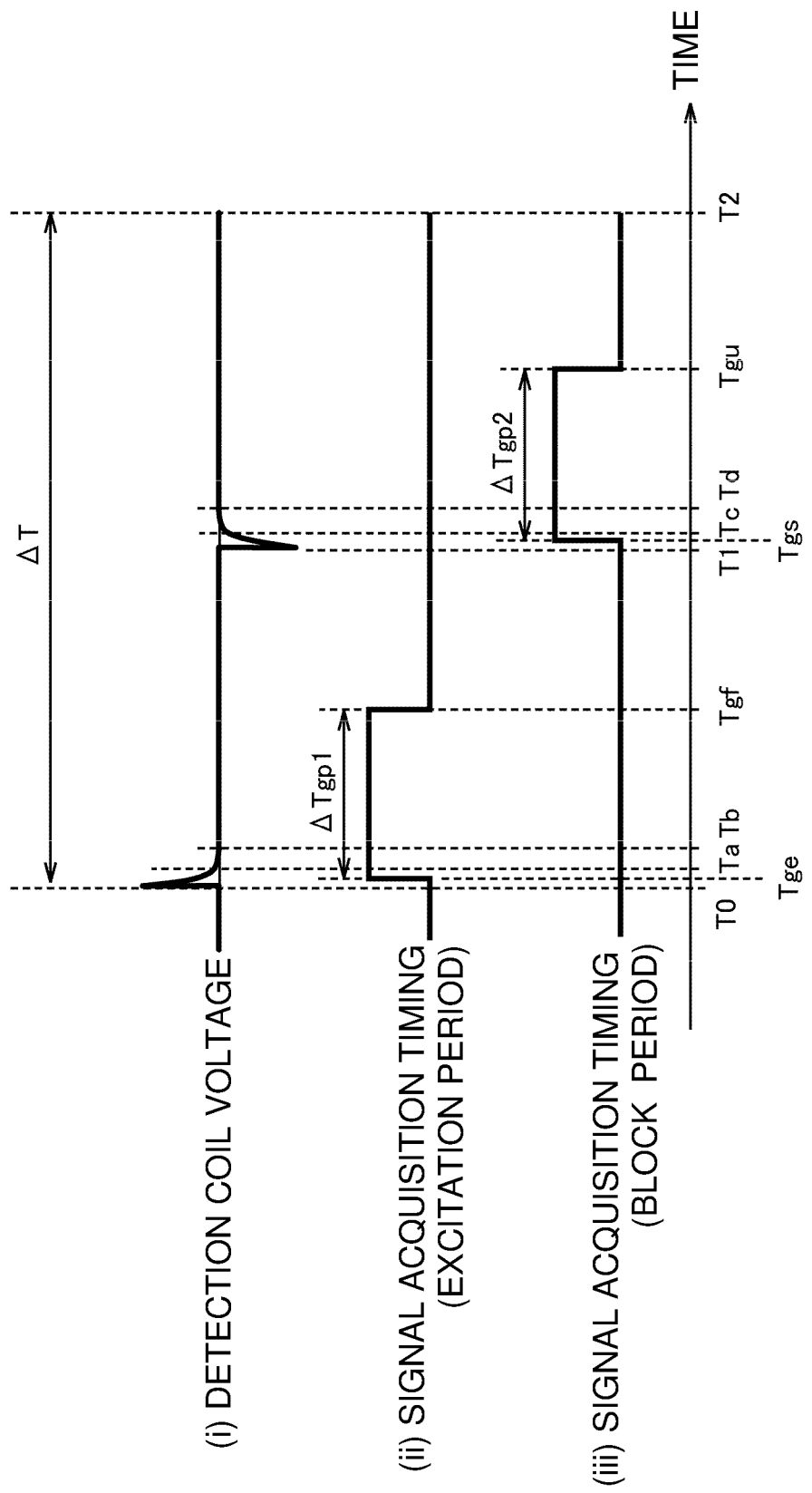
FIG. 10 is a diagram showing signal acquisition timing in an excitation period and a block period.

FIG. 10 is a diagram showing signal acquisition timing in the excitation period and the block period. Referring to FIG. 10, the computation circuit 62 acquires a detection coil voltage in a period ΔTgp1. The period ΔTgp1 is selectively set by the acquired factor. In the case of acquiring the coil inductance, a time Tge after the excitation start time T0 may be set, and a time Tgf before the time Ta may be set. In the case of acquiring coil resistance, the time Tge after the time Tb may be set and the time Tgf before the block period start time T1 (=T0+ΔTe) may be set. In the case of acquiring both the coil inductance and the coil resistance, the time Tge after the excitation start time T0 may be set, and the time Tgf before the block period start time T1 may be set.

The computation circuit 62 acquires at least one of a detection signal (specifically, a coil inductance detection signal VLe) obtained by performing predetermined processing on the signal in the period Tx (from the time T0 to the time Ta) illustrated in FIG. 9 and a detection signal (specifically, a coil resistance detection signal VRe) obtained by performing predetermined processing on the signal in the period Tz (from the time Tb to the time T1) illustrated in FIG. 9 from among the acquired detection coil voltages.

The computation circuit 62 acquires a detection coil voltage in a period ΔTgp2. The period ΔTgp2 is a period from a time Tgs that comes after the block start time T1 (=T0+ΔTe) to a time Tgu that comes before the excitation period start time T2. As the period ΔTgp2, a time during which the influence of the detection body can be effectively acquired in the signal from the time Tc to the time Td may be selected.

The computation circuit 62 acquires a detection body detection signal VLs from among the acquired detection coil voltages. Specifically, the computation circuit 62 acquires the detection body detection signal VLs by using the detection coil voltage in the period Ty' (from the time Tc to the time Td) illustrated in FIG. 9.

The computation circuit 62 compensates the detection body detection signal VLs using at least one of the coil inductance detection signal VLe and the coil resistance detection signal VRe. In this manner, the computation circuit 62 can acquire a detection body determination signal that is not influenced by a change in coil properties.

Figure 11:
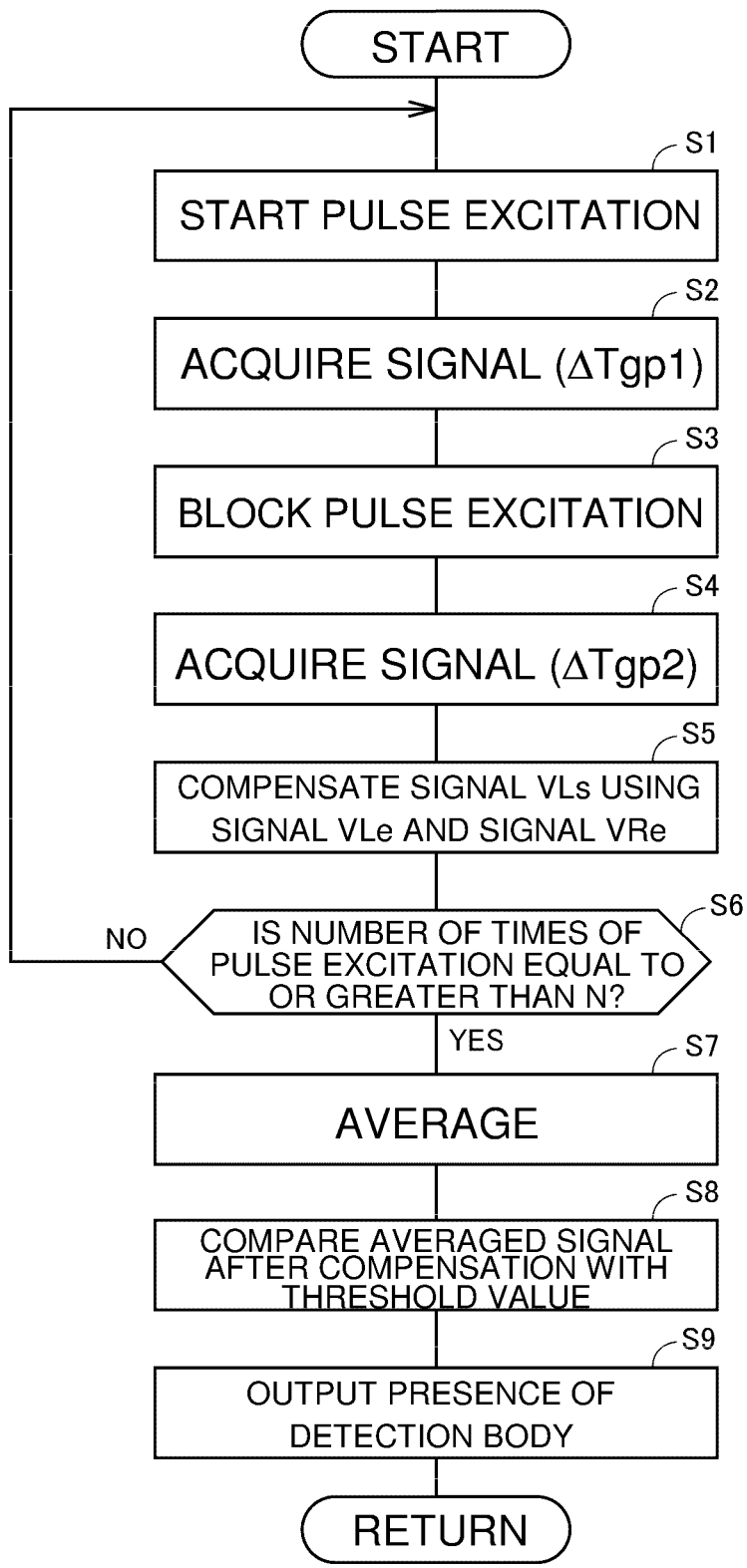
FIG. 11 is a flowchart showing a flow of processing that is executed by the proximity sensor.

FIG. 11 is a flowchart showing a flow of processing that is executed by the proximity sensor 1. Referring to FIG. 11, the excitation circuit 51 starts pulse excitation on the basis of an excitation control signal from the control circuit 61 in Step S1. In Step S2, the computation circuit 62 acquires a signal (detection coil voltage) in the period ΔTgp1 (see FIG. 10).

In Step S3, the excitation circuit 41 blocks the pulse excitation after elapse of a time ΔTe from the pulse excitation. In Step S4, the computation circuit 62 acquires a signal (detection coil voltage) in a period ΔTgp2 (see FIG. 10).

In Step S5, the computation circuit 62 compensates the detection body detection signal VLs using at least one of the coil inductance detection signal VLe and the coil resistance detection signal VRe. The computation circuit 62 temporarily stores the signal VLs after the compensation.

In Step S6, it is determined whether or not the number of times of the pulse excitation has reached N or greater (N is a natural number set in advance). In a case in which it is determined that the number of times is less than N (No in Step S6), the processing is returned to Step S1. In a case in which it is determined that the number of times is equal to or greater than N (Yes in Step S6), N signals VLs after the compensation are averaged in Step S7.

In Step S8, the computation circuit 62 compares the averaged signal VLs after the compensation with a preset threshold value. In Step S9, the computation circuit 62 determines the presence of the detection body 700 on the basis of the comparison result and causes the output part 70 to output the result.

In the case of a configuration in which the computation circuit 62 determines the position of the detection body 700 rather than the determination of the presence of the detection body 700, the computation circuit 62 converts the averaged signal VLs after the compensation into positional information instead of the processing in Step S8. Further, the computation circuit 62 causes the output part 70 to output the positional information of the detection body 700 instead of the processing in Step S9.

(1) Influence of Change in Inductance

In a case in which a change in the inductance of the detection coil 11 has occurred, the change in the inductance appears in the magnitude of the voltage in the period Tx (from the time T0 to the time Ta) during which the inductive voltage of the detection coil 11 itself is dominant in the period ΔTgp1 (see FIG. 10). In the period ΔTgp2, the inductive voltage of the detection coil 11 itself becomes small, and the influence of the eddy current due to the detection body 700 appears dominantly. Although the influence of the change in the inductance of the detection coil 11 itself also appears in the voltage signal representing the influence of the eddy current due to the detection body 700 in the period ΔTgp2 at this time, this can be compensated for by the signal acquired in the period ΔTgp1.

Figure 12:
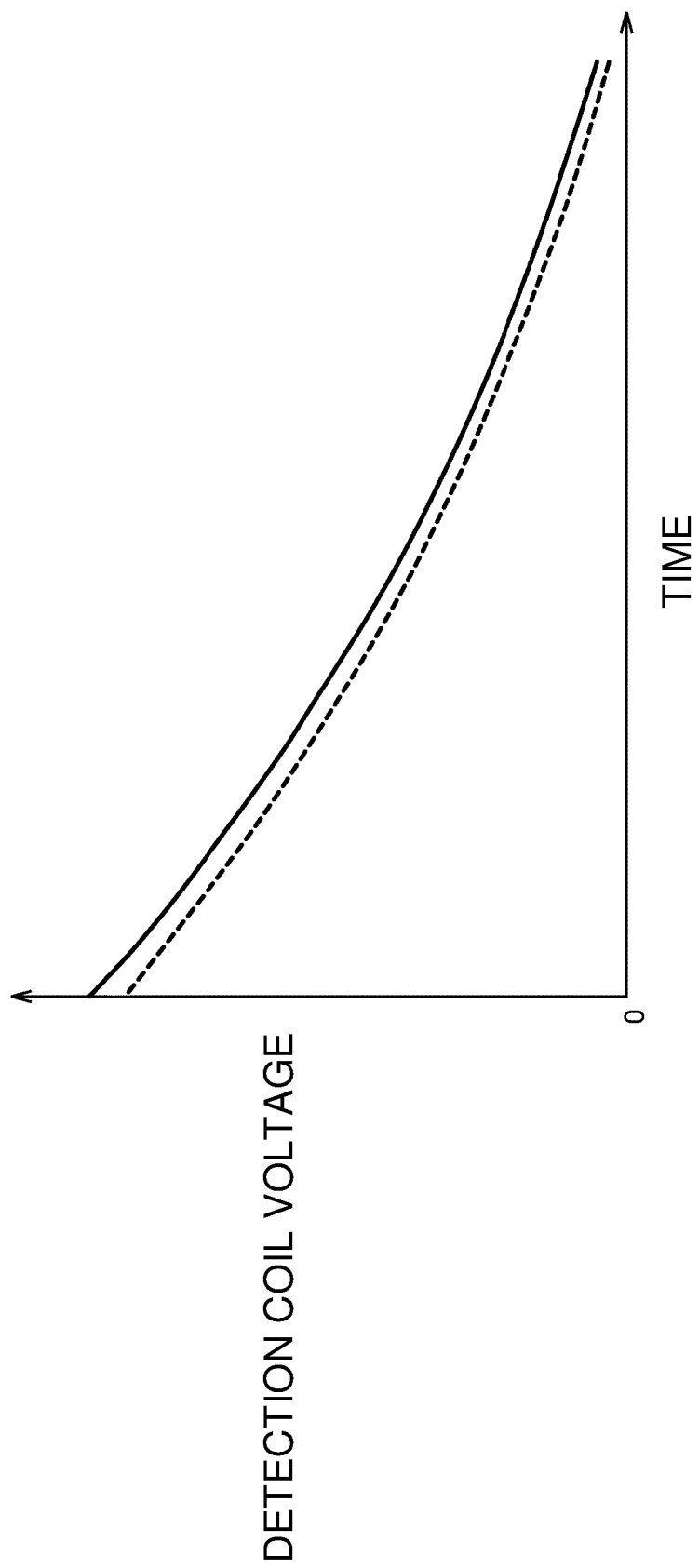
FIG. 12 is a diagram showing a temporal change in the detection coil voltage in a period Tx in a case in which there is no detection body.
Figure 13:
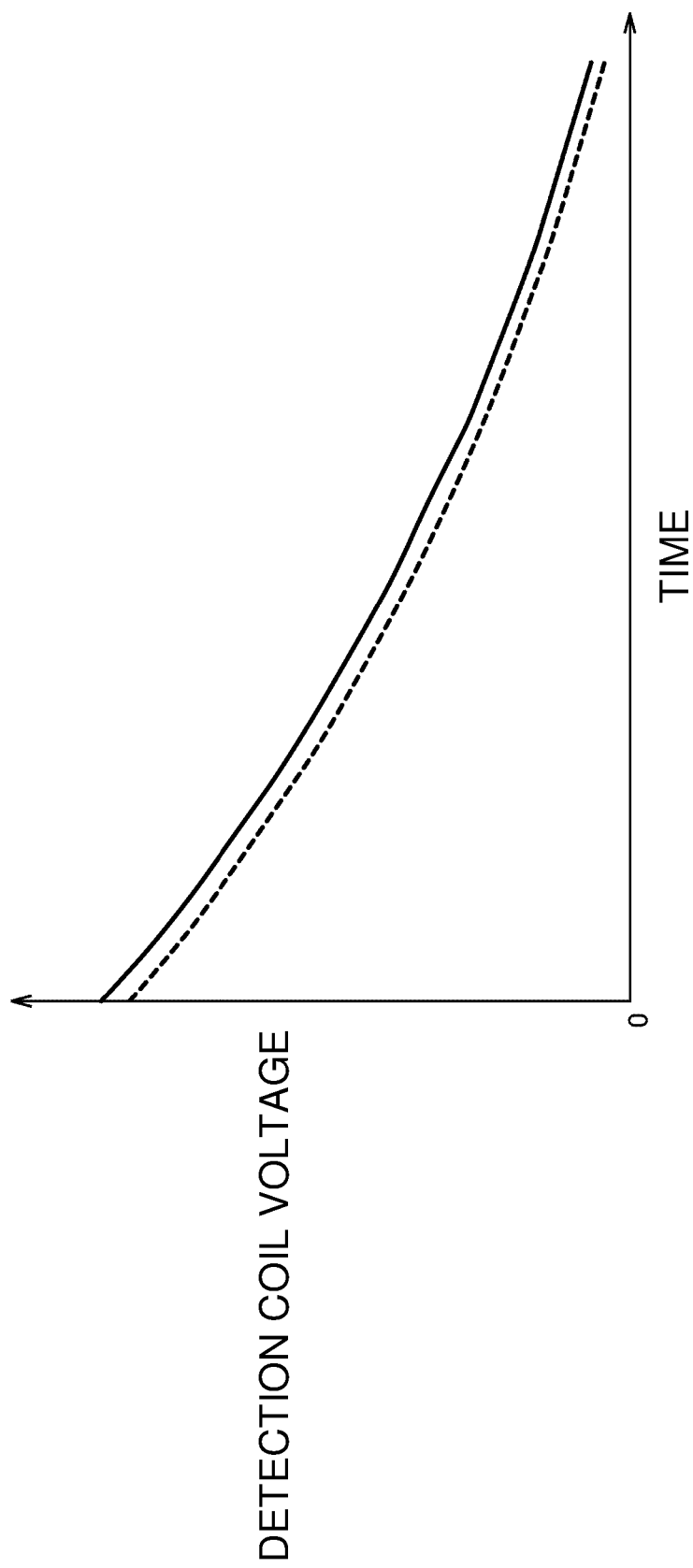
FIG. 13 is a diagram showing a temporal change in the detection coil voltage in the period Tx in a case in which there is a detection body.

FIG. 12 is a diagram showing a temporal change in the detection coil voltage in the period Tx (from the time T0 to the time Ta) in a case in which there is no detection body 700. FIG. 13 is a diagram showing a temporal change in the detection coil voltage in the period Tx (from the time T0 to the time Ta) in a case in which there is a detection body 700.

Referring to FIG. 12, the graph of the solid line represents a reference detection coil voltage in the case in which there is no detection body 700, and the graph of the broken line represents a detection coil voltage when there is a change in the inductance in the case in which there is no detection body 700. Referring to FIG. 13, the graph of the solid line represents a reference detection coil voltage in the case in which there is a detection body 700, and the graph of the broken line represents a detection coil voltage when there is a change in the inductance in the case in which there is a detection body 700.

There is a correlation between the coil inductance detection signal VLe generated by the signal in the period Tx (from the time T0 to the time Ta) during which the inductive voltage of the detection coil 11 itself is dominant in the period ΔTgp1 and the detection body detection signal VLs generated by the detection coil voltage in the period ΔTgp2. Therefore, the computation circuit 62 calculates the amount of change due to the inductance on the basis of the amount of change in the coil inductance detection signal VLe from the reference (that is, in the case in which there is no change in the inductance) coil inductance detection signal VLe, and subtracts the calculated amount of change from the detection body detection signal VLs. In this manner, an effect of compensating for the influence of the change in the inductance can be obtained.

Figure 14:
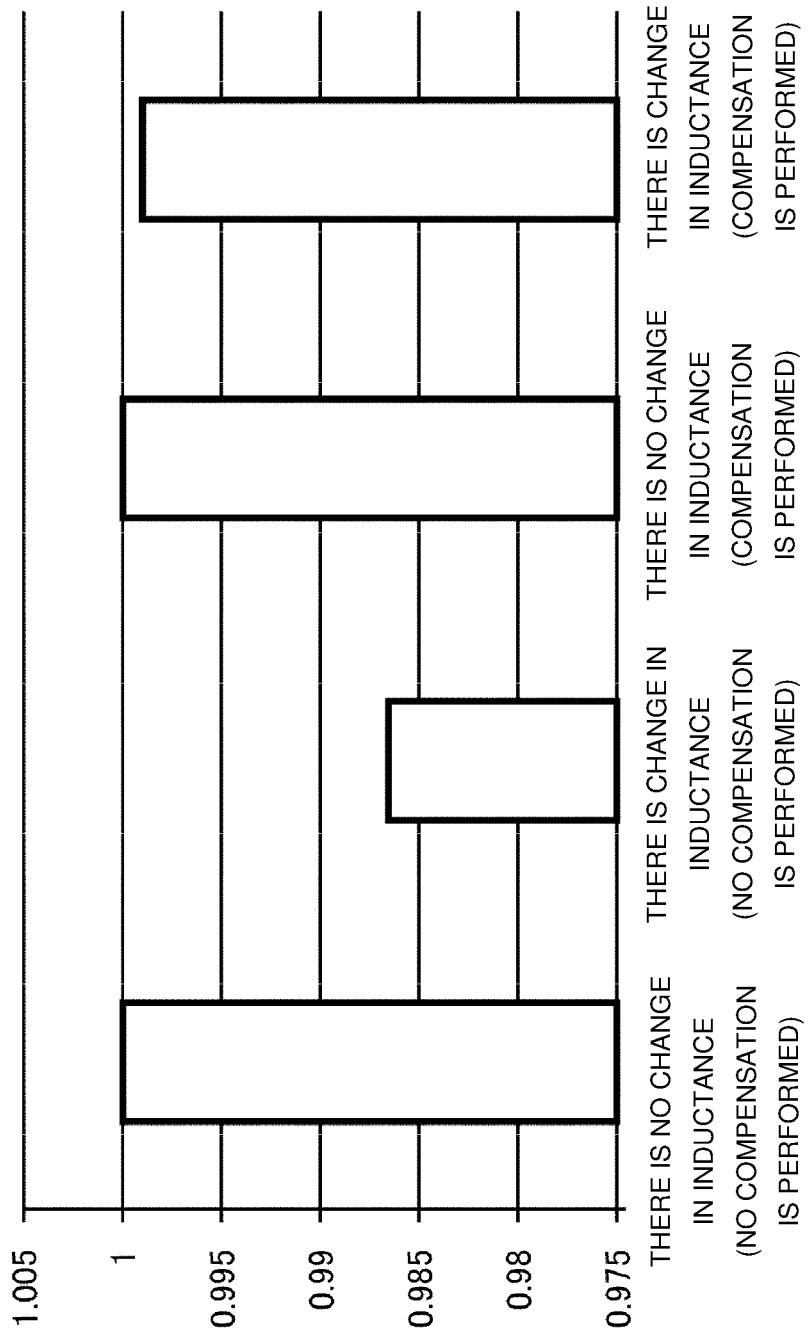
FIG. 14 is a diagram showing a change rate obtained by normalizing a detection body detection signal on the assumption that there is no change in coil inductance in a case in which there is a detection body.

FIG. 14 is a diagram showing a change rate obtained by normalizing the detection body detection signal Vls on the assumption that there is no change in the coil inductance in the case in which there is a detection body 700. Referring to FIG. 14, in the case in which there is a change in the inductance, the change rate approaches 1 when the above compensation is performed as compared with a case in which no compensation is performed. That is, it is possible to obtain a result that is closer to that in the case in which there is no change in the inductance by the above compensation. That is, it is possible to obtain the effect of compensating for the influence of the change in the inductance as described above.

(2) Influence of Change in Resistance

In a case in which a change in the resistance of the detection coil 11 has occurred, the change in the coil resistance appears in the magnitude of the voltage in a period (from the time Tb to the time T1) during which the inductive voltage is not generated in the period ΔTgp1 (see FIG. 10). Although the influence of the change in the resistance of the detection coil 11 also appears in the voltage signal representing the influence of the eddy current due to the detection body 700 in the period ΔTgp2, this can be compensated for by the signal acquired in the period ΔTgp1.

Figure 15:
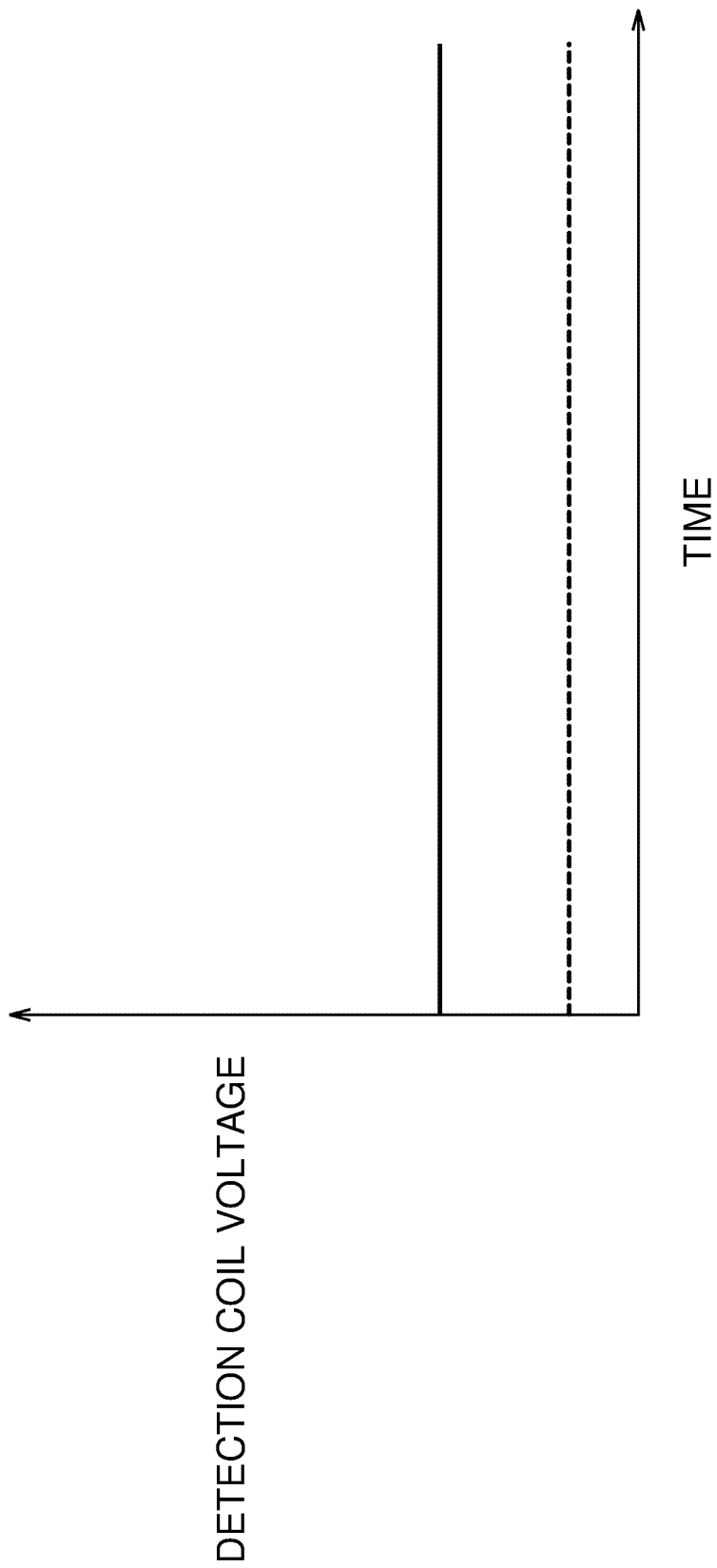
FIG. 15 is a diagram showing a temporal change in the detection coil voltage at and after a time Ta in a case in which there is no detection body.
Figure 16:
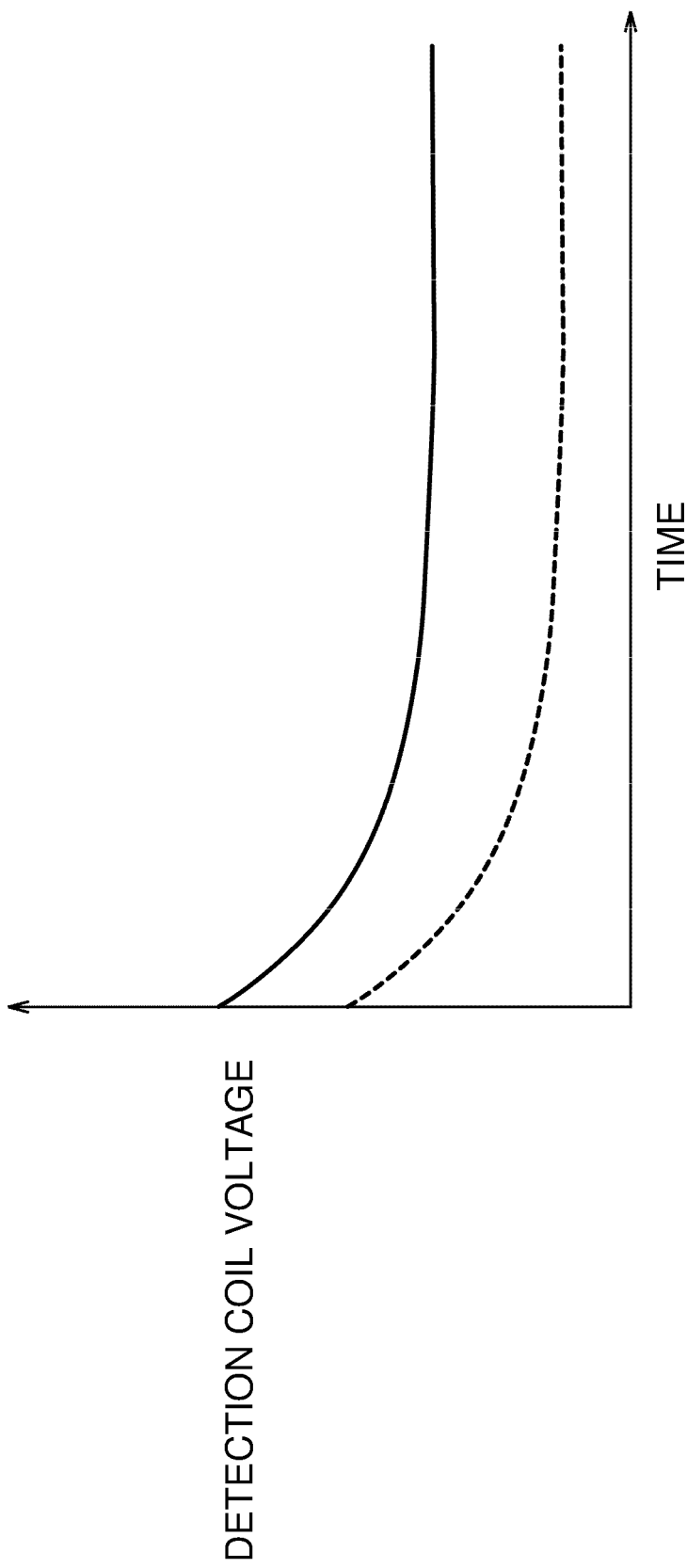
FIG. 16 is a diagram showing a temporal change in the detection coil voltage at and after the time Ta in a case in which there is a detection body.

FIG. 15 is a diagram showing a temporal change in the detection coil voltage at and after the time Ta (including the time Tb) in the case in which there is no detection body 700. FIG. 16 is a diagram showing a temporal change in the detection coil voltage at and after the time Ta (including the time Tb) in the case in which there is a detection body 700.

Referring to FIG. 15, the graph of the solid line represents a reference detection coil voltage in the case in which there is no detection body 700, and the graph of the broken line represents a detection coil voltage when there is a change in the coil resistance in the case in which there is no detection body 700. Referring to FIG. 16, the graph of the solid line represents a reference detection coil voltage in the case in which there is a detection body 700, and the graph of the broken line represents a detection coil voltage when there is a change in the coil resistance in the case in which there is a detection body 700.

There is a correlation between the coil resistance detection signal VRe generated by the signal after the inductive voltage in the period ΔTgp1 completely settles down (at and after the time Tb) and the detection body detection signal VLs generated by the voltage signal in the period ΔTgp2. Therefore, the computation circuit 62 calculates the amount of change due to the resistance on the basis of the amount of change in the coil resistance detection signal VRe from the reference (that is, in the case in which there is no change in the coil resistance) coil resistance detection signal VRe, and subtracts the calculated amount of change from the detection body detection signal VLs. In this manner, an effect of compensating for the influence of the change in the coil resistance can be obtained.

Figure 17:
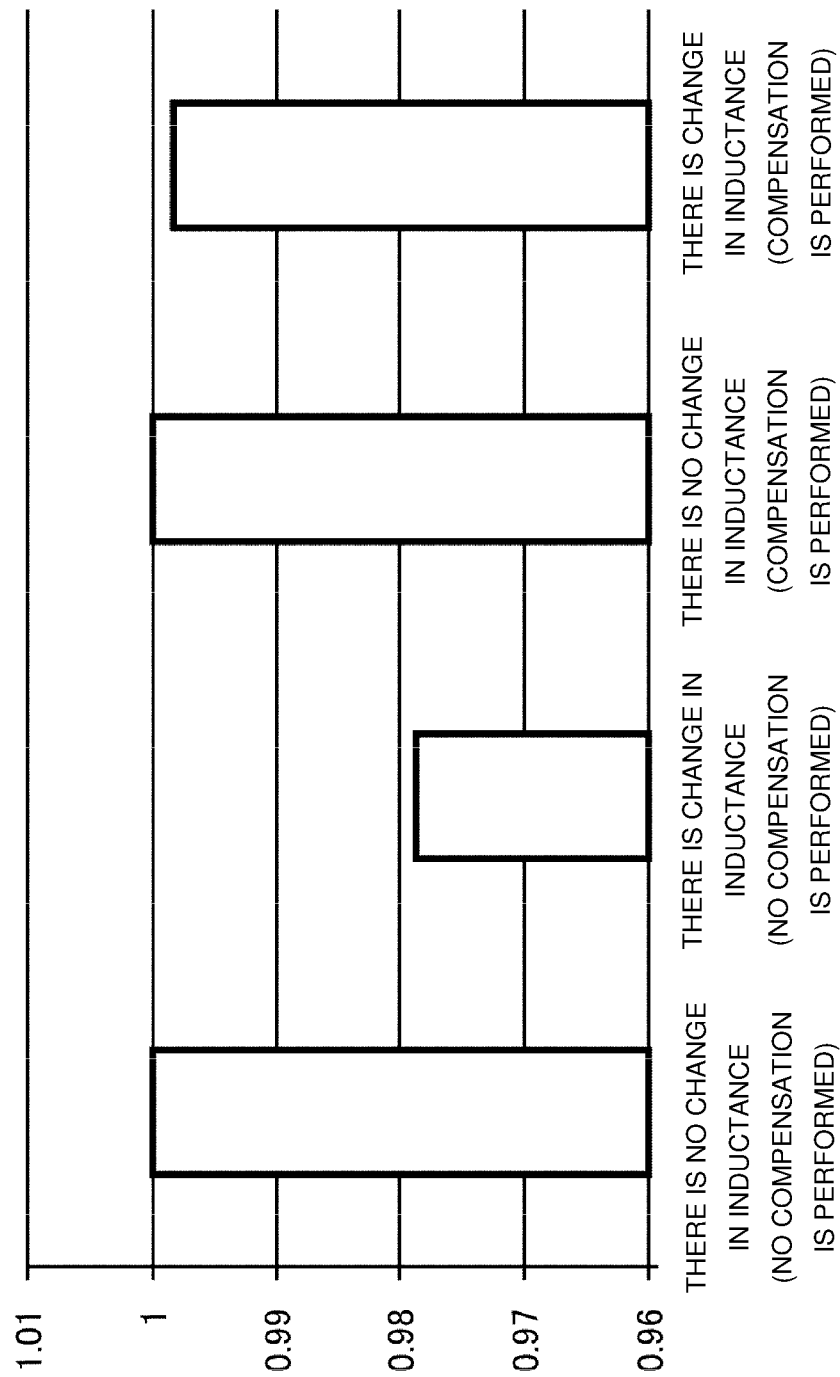
FIG. 17 is a diagram showing a change rate obtained by normalizing the detection body detection signal on the assumption that there is no change in coil resistance in a case in which there is a detection body.

FIG. 17 is a diagram showing a change rate obtained by normalizing the detection body detection signal VLs on the assumption that there is no change in the coil resistance in a case in which there is a detection body 700. Referring to FIG. 17, the change rate approaches 1 as compared with a case in which no compensation is performed, by performing the above compensation in the case in which there is a change in the coil resistance. That is, it is possible to obtain a result similar to that in the case in which there is no change in the coil resistance by performing the above compensation. That is, the effect of compensating the influences of the change in the coil resistance is obtained as described above.

(C4. Compensation Method)

(1) Compensation of Change in Inductance

Figure 18:
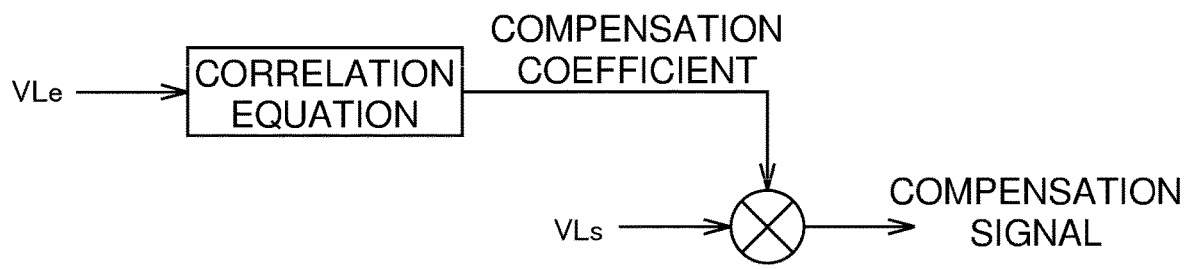

FIG. 18 is a diagram for explaining processing when the change in the inductance of the detection coil 11 is compensated for. That is, FIG. 18 is a diagram for explaining processing when the detection body detection signal VLs is compensated using the coil inductance detection signal VLe.

Referring to FIG. 18, a correlation equation between the change rate of the coil inductance detection signal VLe and the change rate of the detection body detection signal VLs for the detection coil voltage (voltage signal) in a reference state in which no change has occurred in the inductance of the detection coil 11 is calculated in a design stage or a fabrication stage of the proximity sensor 1.

The computation circuit 62 of the proximity sensor 1 calculates a compensation coefficient on the basis of the change rate of the coil inductance detection signal VLe from the reference signal and the aforementioned correlation equation calculated in advance at the time of the detection. The computation circuit 62 compensates the detection body detection signal VLs using the compensation coefficient.

(2) Compensation of Change in Coil Resistance

Figure 19:
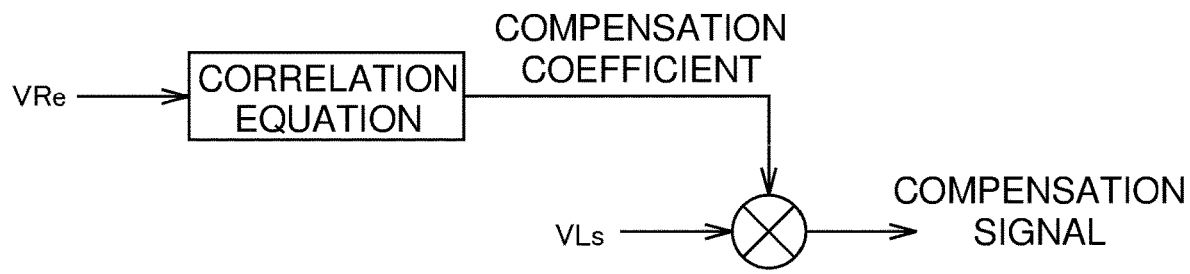

FIG. 19 is a diagram for explaining processing when a change in the resistance of the detection coil 11 is compensated for. That is, FIG. 19 is a diagram for explaining processing when the detection body detection signal VLs is compensated using the coil resistance detection signal VRe.

Referring to FIG. 19, a correlation equation between the change rate of the coil resistance detection signal VRe and the change rate of the detection body detection signal VLs for the detection coil voltage (voltage signal) in the reference state in which no change has occurred in the resistance of the detection coil 11 in the design stage or the fabrication stage of the proximity sensor 1.

The computation circuit 62 of the proximity sensor 1 calculates a compensation coefficient on the basis of the change rate of the coil resistance detection signal VRe from the reference signal and the aforementioned correlation equation calculated in advance at the time of the detection. The computation circuit 62 compensates the detection body detection signal VLs using the compensation coefficient.

(3) Compensation of Change in Inductance and Change in Coil Resistance

Figure 20:
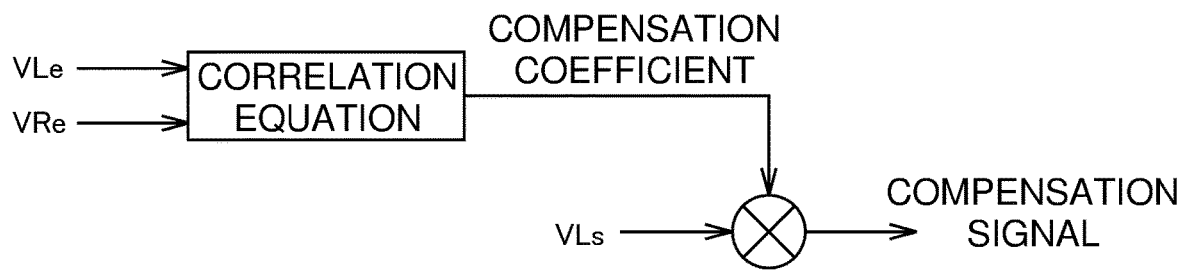

FIG. 20 is a diagram for explaining processing when a change in the inductance and a change in the resistance of the detection coil 11 are compensated for. That is, FIG. 20 is a diagram for explaining processing when the detection body detection signal VLs is compensated using the coil inductance detection signal VLe and the coil resistance detection signal VRe.

Referring to FIG. 20, The correlation equation between the change rate of the coil inductance detection signal VLe and the coil resistance detection signal VRe and the change rate of the detection body detection signal VLs is calculated for the detection coil voltage (voltage signal) in the reference state in which no change has occurred in the inductance and the resistance of the detection coil 11, in the design stage or the fabrication stage of the proximity sensor 1.

The computation circuit 62 of the proximity sensor 1 calculates a compensation coefficient on the basis of the change rate of the coil inductance detection signal VLe from the reference signal, the change rate of the coil resistance detection signal VRe from the reference signal, and the aforementioned correlation equation calculated in advance at the time of the detection. The computation circuit 62 compensates the detection body detection signal VLs using the compensation coefficient.

D. REMOVAL OF HIGH-FREQUENCY NOISE

As one form of the compensation of the detection body detection signal VLs, a method of removing high-frequency noise due to a disturbance will be described.

The proximity sensor 1 has a possibility of various kinds of noise such as inverter noise, radiated emission noise, and power source line noise being constantly added to the detection coil voltage (voltage signal). Thus, the noise components are obtained in the period Tx, Tx' (see FIG. 9) during which the inductive voltage of the detection coil 11 itself is dominant or the period Tz, Tz' during which the resistance value of the detector 30 is dominant. Further, the calculated noise components are subtracted from the detection coil voltage in the period Ty, Ty' during which the inductive voltage of the detection body 700 is dominant. Hereinafter, a specific example of the processing will be described.

Figure 21:
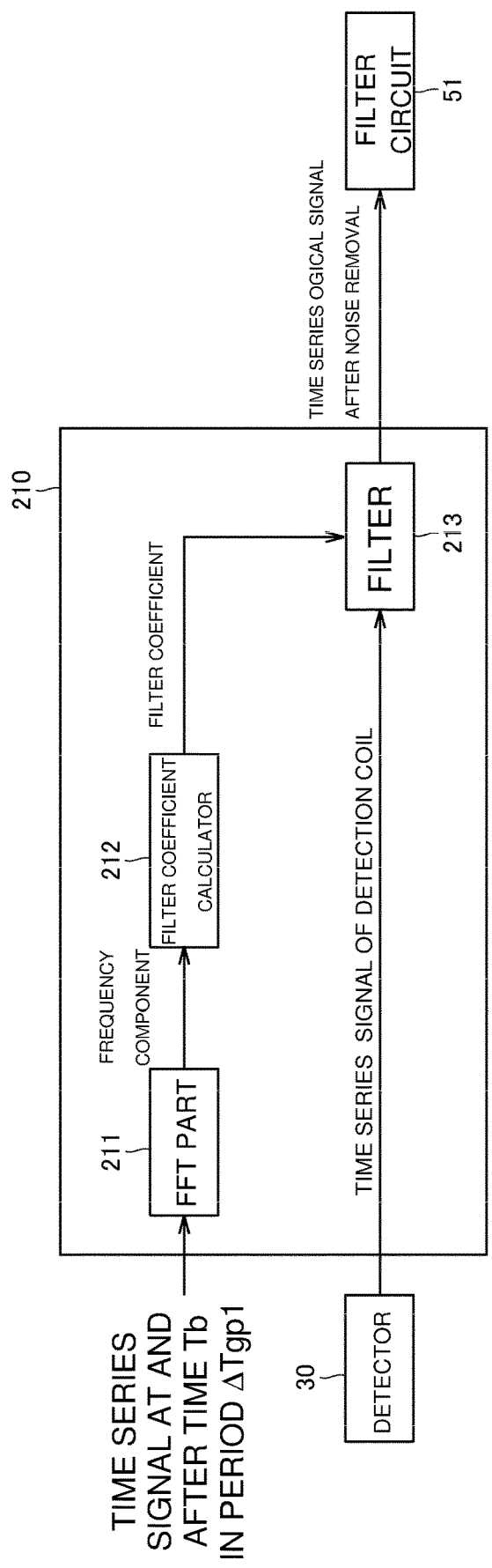
FIG. 21 is a diagram showing a noise removing circuit for removing high-frequency noise.

FIG. 21 is a diagram showing a noise removing circuit 210 for removing high-frequency noise. Referring to FIG. 21, the noise removing circuit 210 includes a fast Fourier transform (FFT) part 211, a filter coefficient calculator 212, and a filter 213. Although the noise removing circuit 210 is typically executed by the computation circuit 62 of the controller 60, the filtering processing executed by the controller 60 may instead be performed by the reception circuit 50 by passing the filter coefficient from the computation circuit 62 to the reception circuit 50 and changing the filter coefficient of the reception circuit 50.

Since the detection coil voltage (voltage signal) is constant in a period during which no inductive voltage is generated by the start of the excitation or the block (for example, at or after the time Tb), it is possible to stably observer the superimposed high-frequency noise. Thus, the FFT part 211 calculates the frequency of the superimposed noise by performing frequency analysis on a time series signal at and after the time Tb in the period ΔTgp1 (see FIG. 10).

The filter coefficient calculator 212 obtains a filter coefficient corresponding to the calculated noise frequency. The filter 213 applies a filter for which the calculated filter coefficient is set on the time series signal acquired from the detector 30. In this manner, it is possible to remove noise with a high effect in a previous stage of the filter circuit 51.

If the computation circuit 62 specifies the noise component, it becomes unnecessary for the filter 213 to perform the filtering processing, by changing the filter coefficient of the filter circuit 51. Therefore, the filter 213 is activated or deactivated in response to a control command.

E. EFFECTS

Effects obtained by the proximity sensor 1 will be listed below.

(1) The inductance component and/or the resistance component of the detection coil 11 at the time of the measurement is acquired by observing how the voltage changes in the pulse excitation period, and in accordance with this, the detection body detection signal VLs is compensated. Therefore, it is possible to reduce the influence of the change in the inductance due to a direct current magnetic field or the like and/or the influence due to a change in the temperature. Further, it is possible to effectively remove the noise by measuring the frequency of the superimposed noise in the pulse excitation period and setting the filter coefficient.

(2) Even when a change in the coil inductance due to the direct current magnetic field, the low-frequency magnetic field, or the like, a change in the coil resistance due to a change in the temperature, or superimposition of electromagnetic noise or the like on the detection signal occurs, it is possible to prevent the determination result of the proximity sensor 1 from being influenced by the occurrence. This phenomenon enables the user to stably perform detection in an environment in which a variation in the temperature occurs or in a magnetic field environment.

(3) The magnitude of the external magnetic field, the temperature, and the frequency of the high-frequency noise can be sensed (output). The aforementioned compensation can also be applied to compensation of individual variations in the inductance component and the resistance component of the detection coil in the fabrication stage of the proximity sensor 1.

F. CONCLUSION (1) The proximity sensor 1 detects the presence or the position of the detection body by utilizing a magnetic field. The proximity sensor 1 includes the detection coil 11 that generates the magnetic field, the transmission circuit 40 that periodically supplies an excitation current in the pulse form to the detection coil 11, the reception circuit 50 that detects voltages or the currents generated at both ends of the detection coil 11 by the periodic supply of the excitation current, and the controller 60 that detects the presence or the position of the detection body 700 by utilizing the time series signal obtained by the detection.

The controller 60 acquires the first factor that influences the detection of the detection body 700 in the first period of the time series signal. The controller 60 compensates the signal in the second period of the time series signal by the first factor. The controller 60 detects the presence or the position of the detection body 700 on the basis of the signal after the compensation.

With such a configuration, it is possible to reduce the influence of a change in the coil properties of the detection coil 11 and/or the influence of disturbance noise.

(2) The controller 60 acquires the second factor that influences the detection of the detection body in the third period of the time series signal. The controller 60 compensates the signal in the second period of the time series signal by the first factor and the second factor.

(3) The first period and the second period are included in the period during which the excitation current is supplied (the excitation period ΔTe in FIG. 6). The third period is included in the period during which the supply of the excitation current is blocked (block period).

In another aspect, the first period, the second period, and the third period are included in the period during which the excitation current is supplied (the excitation period ΔTe) as illustrated in FIG. 2. The first period, the second period, and the third period are included in the period during which the supply of the excitation current is blocked (block period).

(4) Any one of the first factor and the second factor is the signal resulting from a change in the inductance of the detection coil 11 (the coil inductance detection signal VLe), and the other is the signal resulting from a change in the resistance of the detection coil 11 (the coil resistance detection signal VRe).

(5) The signal in the second period is the signal resulting from the detection body (the detection body detection signal VLs). The controller 60 compensates the signal resulting from the detection body (the detection body detection signal VLs) by subtracting the signal resulting from the change in the inductance of the detection coil 11 (the coil inductance detection signal VLe) and the signal resulting from the change in the resistance of the detection coil 11 (the coil resistance detection signal VRe) from the signal resulting from the detection body (the detection body detection signal VLs).

(6) The first factor is the signal resulting from the change in the inductance of the detection coil (the coil inductance detection signal VLe) or the signal resulting from the change in the resistance of the detection coil (the coil resistance detection signal VRe).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A proximity sensor that detects presence or position of a detection body by utilizing a magnetic field, the proximity sensor comprising:
    a detection coil that generates the magnetic field;
    a transmission circuit that periodically supplies an excitation current in a pulse form to the detection coil;
    a reception circuit that performs detection of voltages or currents generated at both ends of the detection coil by periodic supplying the excitation current; and
    a controller that detects the presence or the position of the detection body by utilizing a time series signal obtained by the detection of the voltages or the currents generated at both ends of the detection coil,
    wherein the controller acquires a first factor that influences detection of the detection body in a first period of the time series signal,
    performs compensation on a signal in a second period of the time series signal by the first factor to generate a compensated signal; and
    detects the presence or the position of the detection body on the basis of the compensated signal after the compensation.

2. The proximity sensor according to claim 1,
    wherein the controller
    acquires a second factor that influences the detection of e detection body in a third period of the time series signal, and
    compensates the signal in the second period of the time series signal by the first factor and the second factor.

3. The proximity sensor according to claim 2,
    wherein the first period and the third period are included in a period during which the excitation current is supplied, and
    the second period is included in a period during which supply of the excitation current is blocked.

4. The proximity sensor according to claim 2,
    wherein the first period, the second period, and the third period are included in a period during which the excitation current is supplied.

5. The proximity sensor according to claim 2,
    wherein the first period, the second period, and the third period are included in a period during which supply of the excitation current is blocked.

6. The proximity sensor according to claim 2,
    wherein any one of the first factor and the second factor is a signal resulting from a change in inductance of the detection coil, and the other is a signal resulting from a change in resistance of the detection coil.

7. The proximity sensor according to claim 3,
    wherein any one of the first factor and the second factor is a signal resulting from a change in inductance of the detection coil, and the other is a signal resulting from a change in resistance of the detection coil.

8. The proximity sensor according to claim 4,
    wherein any one of the first factor and the second factor is a signal resulting from a change in inductance of the detection coil, and the other is a signal resulting from a change in resistance of the detection coil.

9. The proximity sensor according to claim 5,
    wherein any one of the first factor and the second factor is a signal resulting from a change in inductance of the detection coil, and the other is a signal resulting froth a change in resistance of the detection coil.

10. The proximity sensor according to claim 6,
    wherein the signal in the second period is a signal resulting from the detection body, and
    the controller performs the compensation by subtracting the signal resulting from the change in the inductance of the detection coil and the signal resulting from the change in the resistance of the detection coil from the signal resulting from the detection body.

11. The proximity sensor according to claim 7,
    wherein the signal in the second period is a signal resulting from the detection body, and
    the controller performs the compensation by subtracting the signal resulting from the change in the inductance of the detection coil and the signal resulting from the change in the resistance of the detection coil from the signal resulting from the detection body.

12. The proximity sensor according to claim 8,
    wherein the signal in the second period is a signal resulting from the detection body, and
    the controller performs the compensation by subtracting the signal resulting from the change in the inductance of the detection coil and the signal resulting from the change in the resistance of the detection coil from the signal resulting from the detection body.

13. The proximity sensor according to claim 9,
    wherein the signal in the second period is a signal resulting from the detection body, and
    the controller performs the compensation by subtracting the signal resulting from the change in the inductance of the detection coil and the signal resulting from the change in the resistance of the detection coil from the signal resulting from the detection body.

14. The proximity sensor according to claim 1,
wherein the first factor is a signal resulting from a change in inductance of the detection coil or a signal resulting from a change in resistance of the detection coil.

15. A method that is executed in a proximity sensor that detects presence or position of a detection body by utilizing a magnetic field, the method comprising:
periodically supplying an excitation current in a pulse form to a detection coil for generating the magnetic field;
performing detection of voltages or currents generated at both ends of the detection coil by periodic supplying the excitation current;
acquiring a first factor that influences detection of the detection body in a first period of a time series signal obtained by the detection of the voltages or the currents generated at both ends of the detection coil;
performing compensation on a signal in a second period of the time series signal by the first factor to generate a compensated signal; and
detecting the presence or the position of the detection body on the basis of the compensated signal after the compensation.

\* \* \* \* \*